(12) United States Patent
Kubota et al.

(10) Patent No.: US 10,180,605 B2
(45) Date of Patent: Jan. 15, 2019

(54) DISPLAY DEVICE AND METHOD FOR MANUFACTURING THE SAME

(71) Applicant: Semiconductor Energy Laboratory Co., Ltd., Kanagawa-ken (JP)

(72) Inventors: Daisuke Kubota, Kanagawa (JP); Koji Kusunoki, Kanagawa (JP); Akio Yamashita, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 15/658,653

(22) Filed: Jul. 25, 2017

(65) Prior Publication Data

US 2018/0031881 A1 Feb. 1, 2018

(30) Foreign Application Priority Data

Jul. 27, 2016 (JP) ................................ 2016-146992
Jul. 27, 2016 (JP) ................................ 2016-146994
Jul. 27, 2016 (JP) ................................ 2016-146996

(51) Int. Cl.
*G02F 1/1345* (2006.01)
*G02F 1/1335* (2006.01)
(Continued)

(52) U.S. Cl.
CPC .......... *G02F 1/1345* (2013.01); *G02F 1/1339* (2013.01); *G02F 1/1347* (2013.01);
(Continued)

(58) Field of Classification Search
CPC .. G02F 1/1335; G02F 1/133555; G02F 1/136; G02F 1/13624; G02F 1/1368;
(Continued)

(56) References Cited

U.S. PATENT DOCUMENTS 6,654,076 B2  11/2003  Ha et al.
9,685,627 B2  6/2017  Chida
(Continued)

*Primary Examiner* — Thoi Duong
(74) *Attorney, Agent, or Firm* — Husch Blackwell LLP

(57) ABSTRACT

A high-image-quality display device having a transmissive mode and a reflective mode is provided. Furthermore, the display device is manufactured with higher yield and higher productivity. In the display device, a transistor used for a transmissive liquid crystal display element, the transmissive liquid crystal display element, a transistor used for a reflective liquid crystal display element, and the reflective liquid crystal display element are stacked in this order between a pair of substrates. In a manufacturing process, one or two manufacturing substrates are used in addition to the pair of substrates included in the display device. The display device is manufactured in such a manner that a second liquid crystal and a second sealant provided to surround the second liquid crystal are bonded to a first liquid crystal sealed using a first sealant. The bonding process is performed such that the first sealant and the second sealant overlap with each other. Moreover, an end portion of the first sealant which is in contact with the first liquid crystal is substantially aligned with or positioned closer to the inner side of the display device than an end portion of the second sealant which is in contact with the second liquid crystal.

8 Claims, 13 Drawing Sheets

(51) Int. Cl.
  *G02F 1/1339* (2006.01)
  *G02F 1/1343* (2006.01)
  *G02F 1/1362* (2006.01)
  *G02F 1/1368* (2006.01)
  *G02F 1/1347* (2006.01)

(52) U.S. Cl.
  CPC ........ *G02F 1/1368* (2013.01); *G02F 1/13439* (2013.01); *G02F 1/133553* (2013.01); *G02F 1/133555* (2013.01); *G02F 1/134309* (2013.01); *G02F 1/136286* (2013.01); *G02F 2201/123* (2013.01); *G02F 2203/01* (2013.01); *G02F 2203/02* (2013.01)

(58) Field of Classification Search
  CPC ......... G02F 1/133514; G02F 1/133553; G02F 1/136286; G02F 1/1343; G02F 1/134309; G02F 1/13394; G02F 1/134336; G02F 1/13458; G02F 1/1339; G02F 1/1362; G02F 1/136227; G02F 1/1333; G02F 1/133345; G02F 1/1345; G02F 1/13452; G02F 2001/136222; G02F 2001/133557; G02F 2001/134372; G02F 2203/02; G09G 2300/0456; G09G 2300/0452; G09G 2300/0426; G09G 3/3648; G09G 3/3677; G09G 3/3688; G09G 3/3655; H01L 27/1214; H01L 27/3244; H01L 27/3211; H01L 27/322; H01L 27/3276; H01L 28/60; H01L 51/0023
  See application file for complete search history.

(56) References Cited

U.S. PATENT DOCUMENTS

| | | |
|---|---|---|
| 2004/0113162 A1* | 6/2004 | Mai .................. G02F 1/133305 257/88 |
| 2016/0042702 A1 | 2/2016 | Hirakata et al. |
| 2016/0283028 A1 | 9/2016 | Yamazaki et al. |
| 2016/0358986 A1 | 12/2016 | Yamazaki et al. |
| 2017/0075155 A1 | 3/2017 | Oikawa et al. |
| 2017/0176791 A1 | 6/2017 | Kubota et al. |
| 2017/0279072 A1 | 9/2017 | Chida |

* cited by examiner

FIG. 6A1 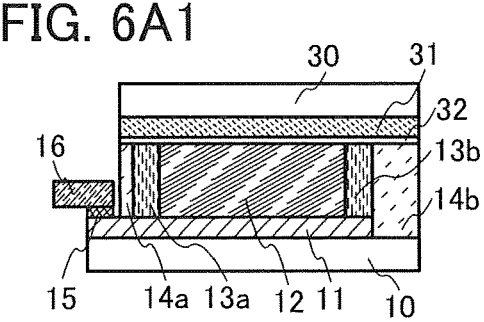
FIG. 6A2 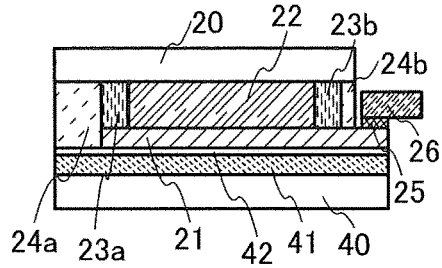
FIG. 6B1 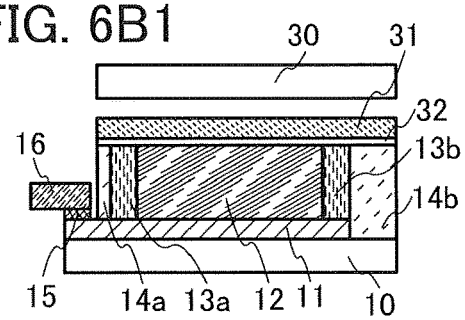
FIG. 6B2 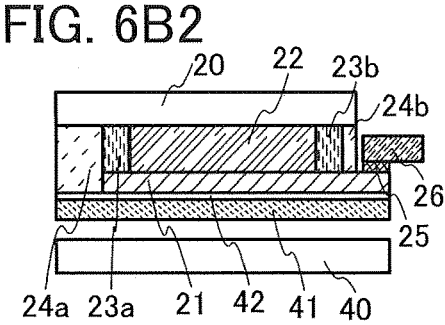
FIG. 6C1 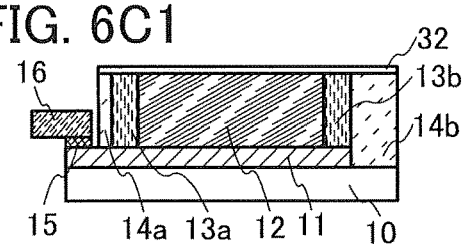
FIG. 6C2

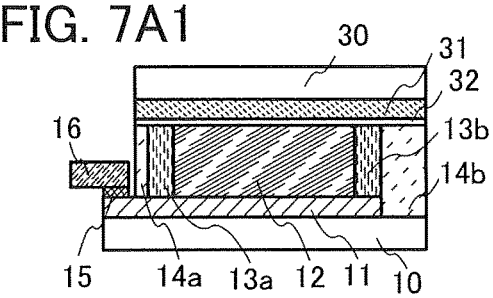
FIG. 7A1
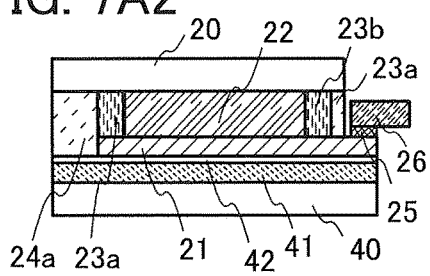
FIG. 7A2
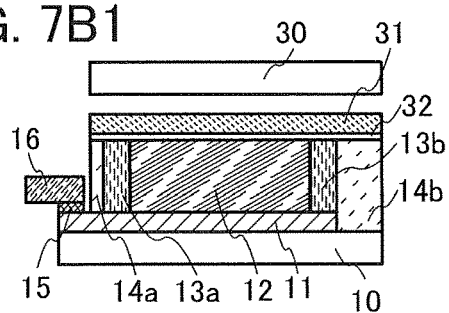
FIG. 7B1
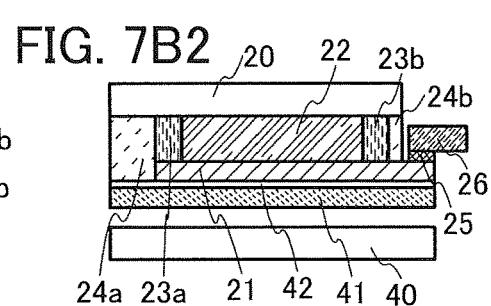
FIG. 7B2
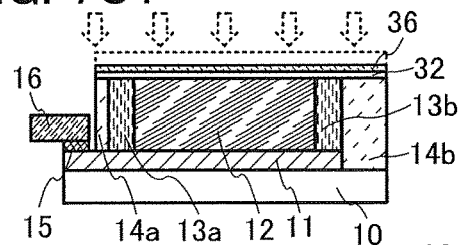
FIG. 7C1
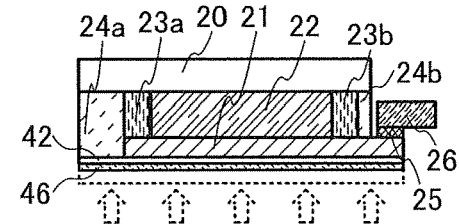
FIG. 7C2
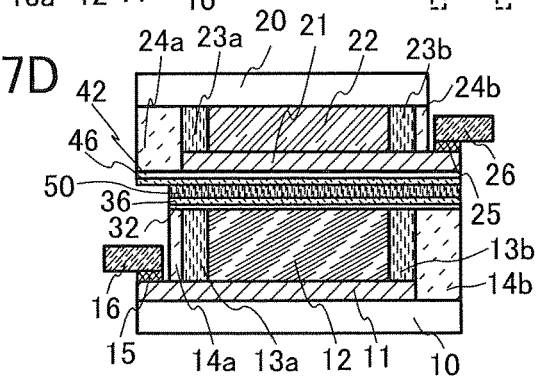
FIG. 7D
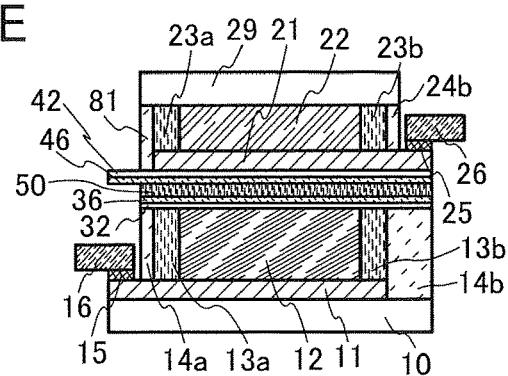
FIG. 7E

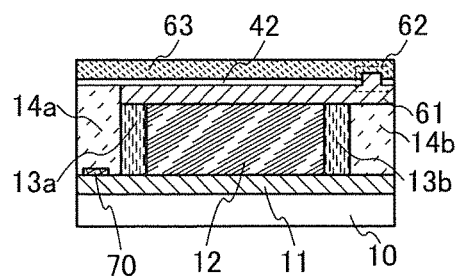
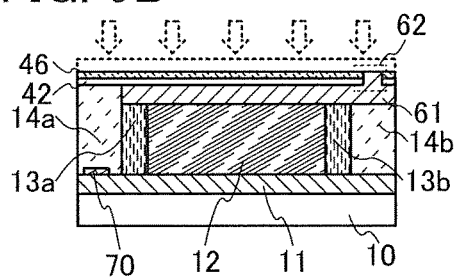
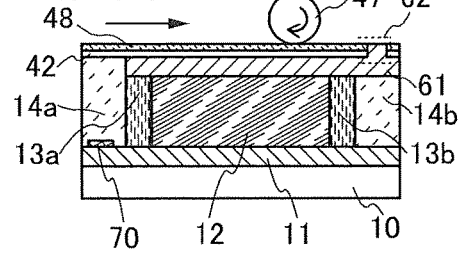
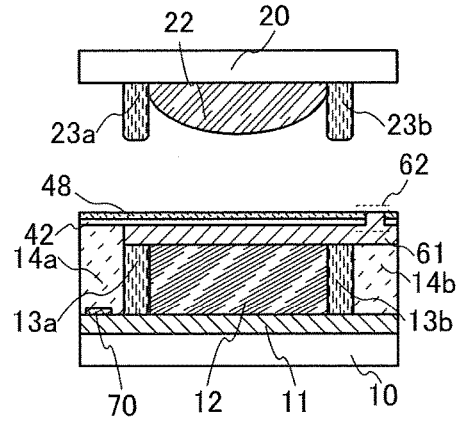
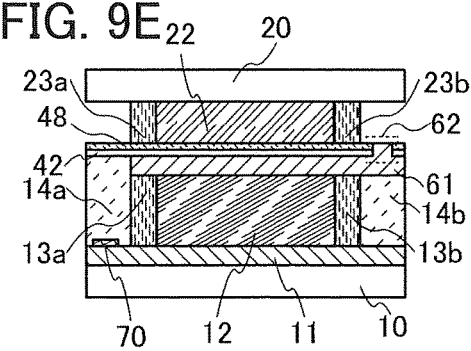
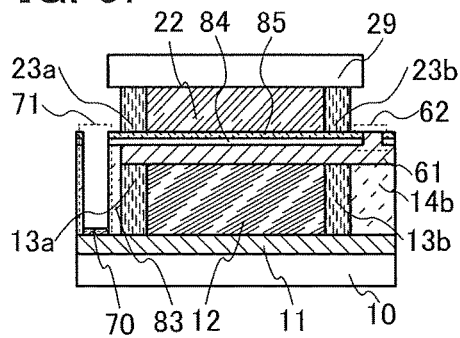
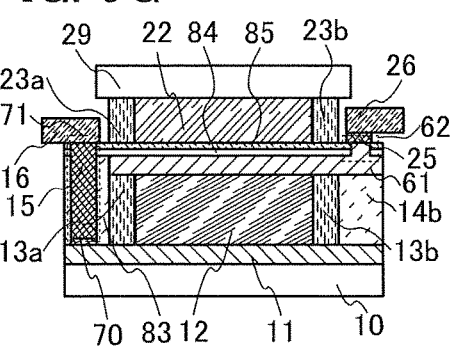

DISPLAY DEVICE AND METHOD FOR MANUFACTURING THE SAME

BACKGROUND OF THE INVENTION

1. Field of the Invention

The present invention relates to a display device and a method for manufacturing the display device.

2. Description of the Related Art

In recent years, liquid crystals have been applied to a variety of devices; in particular, liquid crystal display devices (liquid crystal displays) having advantages of thinness and lightness have been used for displays in a wide range of fields.

There are two types of liquid crystal display devices: a transmissive mode liquid crystal display device using light from a backlight and a reflective mode liquid crystal display device using reflected light obtained by reflection of external light. In addition, transflective liquid crystal display devices having a transmissive mode and a reflective mode have been proposed. Patent Document 1 discloses a transflective liquid crystal display device including a transmissive region and a reflective region in one pixel.

REFERENCE

Patent Document

[Patent Document 1] U.S. Pat. No. 6,654,076

SUMMARY OF THE INVENTION

However, the transmissive mode and the reflective mode have different characteristics and optimal conditions, and thus there is a problem in that when the optimal conditions of one of the transmissive mode and the reflective mode have higher priority, the performance of the other is reduced. Accordingly, as described in Patent Document 1, for example, an attempt to make the thicknesses of liquid crystals in the transmissive region and the reflective region different so that the transmittance is uniform in the transmissive mode and the reflective mode has been made.

An object of one embodiment of the present invention is to provide a high-image-quality display device having a transmissive mode and a reflective mode.

Another object of one embodiment of the present invention is to provide a method for manufacturing the display device with higher yield and higher productivity.

One embodiment of the present invention is a display device including a first substrate; a layer including a first transistor; a first display element including a first pixel electrode layer, a first liquid crystal, and a first counter electrode layer; a layer including a second transistor; and a second display element including a second pixel electrode layer, a second liquid crystal, and a second counter electrode layer. In the display device, the first substrate, the layer including the first transistor, the first pixel electrode layer, the first liquid crystal, the first counter electrode layer, the layer including the second transistor, the second pixel electrode layer, the second liquid crystal, and the second counter electrode layer are stacked in this order; the first counter electrode layer and the layer including the second transistor are in contact with each other; the second pixel electrode layer and the layer including the second transistor are in contact with each other; the first display element is a transmissive display element; the second display element is a reflective display element; the first substrate, a second substrate, the first pixel electrode layer, the first counter electrode layer, and the second counter electrode layer have a light-transmitting property; and the second pixel electrode layer has a reflective property.

In the above embodiment, the layer including the second transistor may include a wiring layer which electrically connects the second transistor and the second pixel electrode layer and an insulating film between the second transistor and the second pixel electrode layer; the insulating film may include an opening reaching the second pixel electrode layer; and the wiring layer may be provided in the opening.

Another embodiment of the present invention is a display device including a first substrate; a layer including a first transistor; a first display element including a first pixel electrode layer, a first liquid crystal, and a first counter electrode layer; a bonding layer; a layer including a second transistor; and a second display element including a second pixel electrode layer, a second liquid crystal, and a second counter electrode layer. In the display device, the first substrate, the layer including the first transistor, the first pixel electrode layer, the first liquid crystal, the first counter electrode layer, the bonding layer, the layer including the second transistor, the second pixel electrode layer, the second liquid crystal, and the second counter electrode layer are stacked in this order; the first counter electrode layer and the layer including the second transistor are firmly attached to each other with the bonding layer; the first display element is a transmissive display element; the second display element is a reflective display element; the first substrate, the first pixel electrode layer, the first counter electrode layer, and the second counter electrode layer have a light-transmitting property; and the second pixel electrode layer has a reflective property.

In the above embodiment, the display device may further include a first terminal electrically connected to the first transistor; a first flexible printed circuit board electrically connected to the first terminal; a second terminal electrically connected to the second transistor; and a second flexible printed circuit board electrically connected to the second terminal.

In the above embodiment, the thickness of the first liquid crystal may be different from the thickness of the second liquid crystal.

In the above embodiment, a material for the first liquid crystal may be different from a material for the second liquid crystal.

In the above embodiment, a driving mode of the first display element may be a vertical alignment mode, and a driving mode of the second display element may be a twisted nematic mode.

In the above embodiment, a structure of the first transistor may be different from a structure of the second transistor.

Another embodiment of the present invention is a method for manufacturing a display device including steps of forming a layer including a first transistor over a first substrate; forming a first pixel electrode layer over the layer including the first transistor; forming a separation layer over a manufacturing substrate; forming a second pixel electrode layer over the separation layer; forming a layer including a second transistor over the second pixel electrode layer; forming a first counter electrode layer over the layer including the second transistor; forming a first liquid crystal over the first counter electrode layer; forming a first sealant surrounding the first liquid crystal; forming a resin layer surrounding the first sealant; bonding the first substrate and the manufacturing substrate to each other using the first sealant and the resin layer such that the first liquid crystal is sealed between the first pixel electrode layer and the first counter electrode layer; separating the manufacturing substrate using the separation layer; removing the separation layer to expose the second pixel electrode layer; forming, over a second substrate, a second counter electrode layer, a second liquid crystal, and a second sealant surrounding the second liquid crystal; and bonding the first substrate and the second substrate to each other using the second sealant such that the second liquid crystal is sealed between the second pixel electrode layer and the second counter electrode layer. In the method for manufacturing a display device, the first substrate, the second substrate, the first pixel electrode layer, the first counter electrode layer, and the second counter electrode layer have a light-transmitting property, and the second pixel electrode layer has a reflective property.

Another embodiment of the present invention is a method for manufacturing a display device including steps of forming a layer including a first transistor over a first substrate; forming a first pixel electrode layer over the layer including the first transistor; forming a separation layer over a manufacturing substrate; forming a second pixel electrode layer over the separation layer; forming a layer including a second transistor over the second pixel electrode layer; forming a first counter electrode layer over the layer including the second transistor; forming a first liquid crystal over the first counter electrode layer; forming a first sealant surrounding the first liquid crystal; forming a resin layer surrounding the first sealant; bonding the first substrate and the manufacturing substrate to each other using the first sealant and the resin layer such that the first liquid crystal is sealed between the first pixel electrode layer and the first counter electrode layer; separating the manufacturing substrate using the separation layer; performing ashing treatment on the separation layer to reduce the thickness; performing rubbing treatment on the separation layer whose thickness is reduced to make the separation layer serve as an alignment film; forming, over a second substrate, a second liquid crystal and a second sealant surrounding the second liquid crystal; and bonding the first substrate and the second substrate to each other using the second sealant such that the second liquid crystal is sealed between the second pixel electrode layer and the second counter electrode layer. In the method for manufacturing a display device, the first substrate, the second substrate, the first pixel electrode layer, the first counter electrode layer, and the second counter electrode layer have a light-transmitting property, and the second pixel electrode layer has a reflective property.

In the above embodiment, a second terminal electrically connected to the second transistor may be exposed by the ashing treatment, and a second flexible printed circuit board electrically connected to the second terminal may be provided.

In the above embodiment, a first terminal electrically connected to the first transistor may be exposed by selective removal of the resin layer, and a first flexible printed circuit board electrically connected to the first terminal may be provided.

In the above embodiment, a release layer may be formed over the first terminal, and the resin layer may be removed selectively using the release layer.

Another embodiment of the present invention is a method for manufacturing a display device including steps of forming a layer including a first transistor and a first pixel electrode layer over a first substrate; forming a first separation layer, a first counter electrode layer, and a first liquid crystal over a first manufacturing substrate; bonding the first substrate and the first manufacturing substrate to each other such that the first liquid crystal is sealed between the first pixel electrode layer and the first counter electrode layer; forming a second separation layer, a layer including a second transistor, a second pixel electrode layer, a second liquid crystal, and a second counter electrode layer over a second manufacturing substrate; separating the first manufacturing substrate using the first separation layer; separating the second manufacturing substrate using the second separation layer; bonding the first counter electrode layer and the layer including the second transistor to each other with a bonding layer therebetween. In the method for manufacturing a display device, the first substrate, the first pixel electrode layer, the first counter electrode layer, and the second counter electrode layer have a light-transmitting property, and the second pixel electrode layer has a reflective property.

In the above embodiment, after separation of the first manufacturing substrate, the first separation layer may be subjected to ashing treatment to reduce the thickness, and after separation of the second manufacturing substrate, the second separation layer may be subjected to ashing treatment to reduce the thickness.

In the above embodiment, a first flexible printed circuit board electrically connected to a first terminal which is electrically connected to the first transistor may be provided before the first manufacturing substrate is separated, and a second flexible printed circuit board electrically connected to a second terminal which is electrically connected to the second transistor may be provided before the second manufacturing substrate is separated.

In the above embodiment, a first display element including the first pixel electrode layer, the first liquid crystal, and the first counter electrode layer may be a transmissive display element, and a second display element including the second pixel electrode layer, the second liquid crystal, and the second counter electrode layer may be a reflective display element.

In the above embodiment, the thickness of the first liquid crystal may be different from the thickness of the second liquid crystal.

In the above embodiment, a material for the first liquid crystal may be different from a material for the second liquid crystal.

In the above embodiment, a driving mode of the first display element may be a vertical alignment mode, and a driving mode of the second display element may be a twisted nematic mode.

In the above embodiment, a structure of the first transistor may be different from a structure of the second transistor.

Another embodiment of the present invention is a method for manufacturing a display device including steps of forming a first pixel electrode layer over a first substrate; forming a separation layer, a second pixel electrode layer, a first counter electrode layer, and a first liquid crystal surrounded by a first sealant over a manufacturing substrate in this order; facing the first substrate and the manufacturing substrate to each other; bonding the first substrate and the manufacturing substrate to each other such that the first liquid crystal is sealed therebetween; separating the manufacturing substrate using the separation layer; forming, over a second substrate, a second liquid crystal and a second sealant surrounding the second liquid crystal; and bonding the first substrate and the second substrate to each other using the second sealant such that the second liquid crystal is sealed between the second pixel electrode layer and a second counter electrode layer. In the method for manufacturing a display device, the first sealant and the second sealant overlap with each other, and an end portion of the first sealant which is in contact with the first liquid crystal is positioned on an inner side than an end portion of the second sealant which is in contact with the second liquid crystal.

Another embodiment of the present invention is a method for manufacturing a display device including steps of forming a layer including a first transistor over a first substrate; forming a first pixel electrode layer over the layer including the first transistor; forming a separation layer over a manufacturing substrate; forming a second pixel electrode layer over the separation layer; forming a layer including a second transistor over the second pixel electrode layer; forming a first counter electrode layer over the layer including the second transistor; forming a first liquid crystal over the first counter electrode layer; forming a first sealant surrounding the first liquid crystal; forming a resin layer surrounding the first sealant; bonding the first substrate and the manufacturing substrate to each other using the first sealant and the resin layer such that the first liquid crystal is sealed between the first pixel electrode layer and the first counter electrode layer; separating the manufacturing substrate using the separation layer; forming, over a second substrate, a second liquid crystal and a second sealant surrounding the second liquid crystal; and bonding the first substrate and the second substrate to each other using the second sealant such that the second liquid crystal is sealed between the second pixel electrode layer and the second counter electrode layer. In the method for manufacturing a display device, the first sealant and the second sealant overlap with each other; and an end portion of the first sealant which is in contact with the first liquid crystal is positioned on an inner side than an end portion of the second sealant which is in contact with the second liquid crystal.

In the above embodiment, the width of the first sealant may be different from the width of the second sealant.

In the above embodiment, the first sealant and the second sealant may be formed using the same material.

In the above embodiment, the first sealant and the second sealant may be formed using different materials.

In the above embodiment, the thickness of the first sealant may be different from the thickness of the second sealant.

In the above embodiment, a resin layer surrounding the first sealant may be formed, and the second sealant may overlap with the resin layer.

In the above embodiment, the first substrate, the second substrate, the first pixel electrode layer, the first counter electrode layer, and the second counter electrode layer may have a light-transmitting property; the second pixel electrode layer may have a reflective property; a first display element including the first pixel electrode layer, the first liquid crystal, and the first counter electrode layer may be a transmissive display element; and a second display element including the second pixel electrode layer, the second liquid crystal, and the second counter electrode layer may be a reflective display element.

Since a transmissive display element and a reflective display element in each of which the material and the thickness are optimized can be each driven by a transistor having required excellent electrical and physical characteristics, a display device having high-image quality and high performance can be provided. In addition, since the transmissive display element and the reflective display element are stacked between a pair of substrates, an increase in the size of the display device can be suppressed.

BRIEF DESCRIPTION OF THE DRAWINGS

FIGS. 6A1 to 6E illustrate one embodiment of a method for manufacturing a display device.

FIGS. 7A1 and 7E illustrate one embodiment of a method for manufacturing a display device.

FIGS. 9A to 9G illustrate one embodiment of a method for manufacturing a display device.

DETAILED DESCRIPTION OF THE INVENTION

Figure 1:
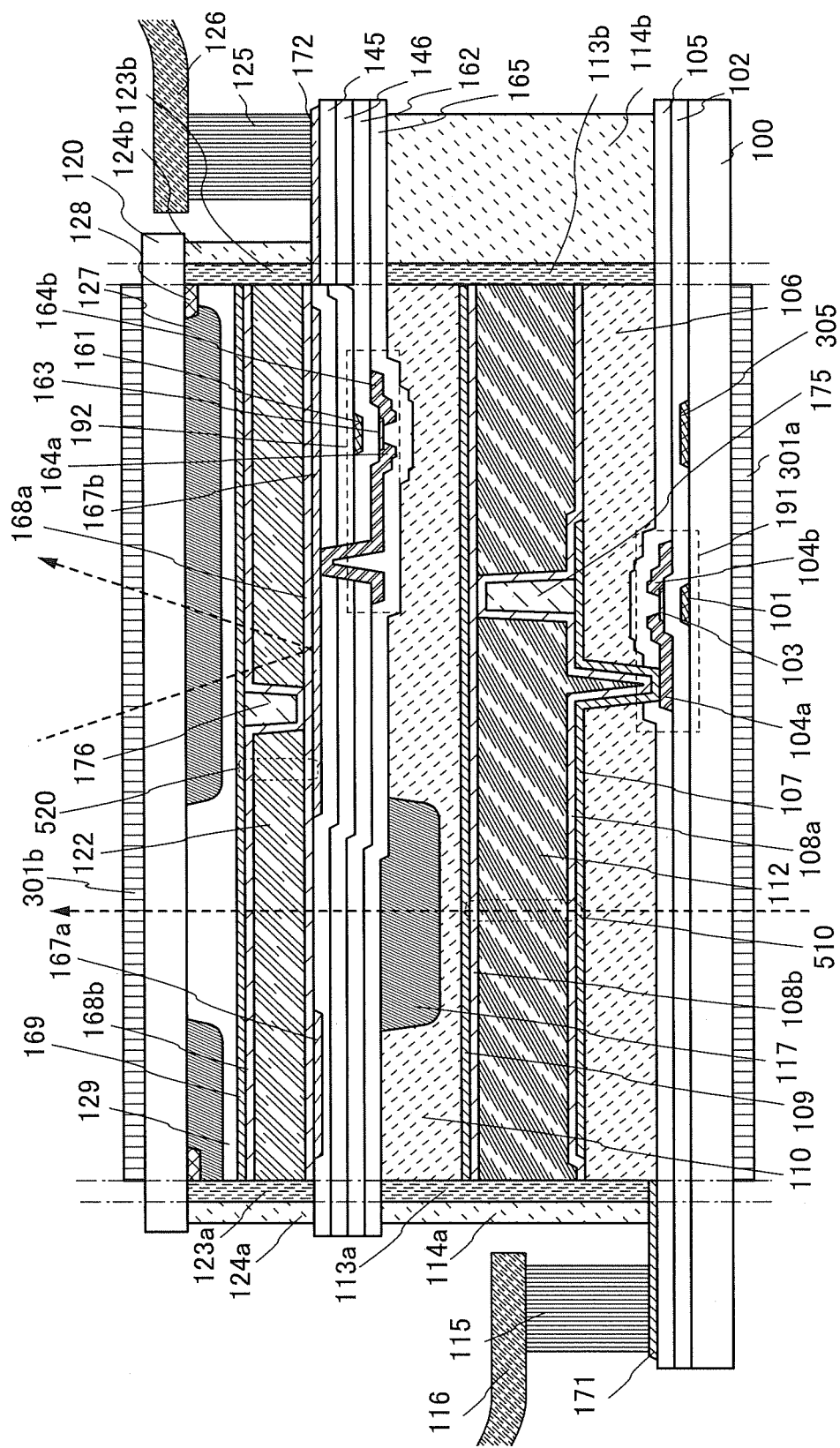
FIG. 1 illustrates one embodiment of a display device.

Embodiments will be described in detail with reference to the drawings. Note that one embodiment of the present invention is not limited to the following description, and it will be easily understood by those skilled in the art that various changes and modifications can be made without departing from the spirit and scope of the present invention. The present invention therefore should not be construed as being limited to the following description of the embodiments. In the structures to be given below, the same portions or portions having similar functions are denoted by the same reference numerals in different drawings, and explanation thereof will not be repeated.

Note that the ordinal numbers such as "first", "second", and "third" in this specification are used for convenience and do not denote the order of steps and the stacking order of layers. Therefore, for example, description can be made even when "first" is replaced with "second" or "third", as appropriate. In addition, the ordinal numbers in this specification and the like are not necessarily the same as those which specify one embodiment of the present invention.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor film of a transistor is called an oxide semiconductor in some cases. That is to say, a metal oxide that has at least one of an amplifying function, a rectifying function, and a switching function can be called a metal oxide semiconductor, or OS for short. In addition, an OS FET is a transistor including a metal oxide or an oxide semiconductor.

In this specification and the like, a metal oxide including nitrogen is also called a metal oxide in some cases. Moreover, a metal oxide including nitrogen may be called a metal oxynitride.

In this specification and the like, "c-axis aligned crystal (CAAC)" or "cloud-aligned composite (CAC)" may be stated in some cases. CAAC refers to an example of a crystal structure, and CAC refers to an example of a function or a material composition.

In this specification and the like, a CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a semiconductor film of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or CAC-metal oxide, separation of the functions can maximize each function.

In this specification and the like, the CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS or the CAC metal oxide, the conductive regions and the insulating regions each have a size of more than or equal to 0.5 nm and less than or equal to 10 nm, preferably more than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used in a semiconductor film of a transistor, high current drive capability in the on state of the transistor, that is, high on-state current and high field-effect mobility, can be obtained.

In other words, CAC-OS or CAC-metal oxide can be called a matrix composite or a metal matrix composite.

Embodiment 1

Embodiments of a display device and a method for manufacturing the display device are described with reference to FIG. 1, FIGS. 2A to 2H, FIGS. 3A to 3C, FIG. 4, FIG. 5, FIGS. 6A1 to 6E, FIGS. 7A1 to 7E, and FIG. 8.

FIG. 1 is a cross-sectional view of one embodiment of a display device. In the display device in FIG. 1, a circularly polarizing plate 301a; a first substrate 100 having a light-transmitting property; a transistor 191 including a gate electrode layer 101, a gate insulating film 102, a semiconductor film 103, and wiring layers 104a and 104b serving as a source electrode layer and a drain electrode layer; a light-blocking film 305 which protects a transistor 192 from light from a backlight which can be used as a light source; an insulating film 105; an insulating film 106 serving as a planarization film; a first pixel electrode layer 107; an insulating film 108a serving as an alignment film; a spacer 175; a first liquid crystal 112; an insulating film 108b serving as an alignment film; a first counter electrode layer 109; an insulating film 110 serving as a planarization film; a coloring layer 117 serving as a color filter; an insulating film 165; a transistor 192 including a gate electrode layer 161, a gate insulating film 162, a semiconductor film 163, and wiring layers 164a and 164b serving as a source electrode layer and a drain electrode layer; an insulating film 145; second pixel electrode layers 167a and 167b; an insulating film 168a serving as an alignment film; a second liquid crystal 122; an insulating film 168b serving as an alignment film; a spacer 176; a second counter electrode layer 169; an insulating film 129 serving as an overcoat film; a coloring layer 127 serving as a color filter; a light-blocking film 128 serving as a black matrix; a second substrate 120 having a light-transmitting property; and a circularly polarizing plate 301b are stacked. The components between the first substrate 100 and the second substrate 120 are sealed with sealants 113a and 113b, sealants 123a and 123b, resin layers 114a and 114b, and resin layers 124a and 124b. A terminal 171 electrically connected to the transistor 191 is electrically connected to a flexible printed circuit board 116 through an anisotropic conductive film 115, and a terminal 172 electrically connected to the transistor 192 is electrically connected to a flexible printed circuit board 126 through an anisotropic conductive film 125.

In the display device illustrated in FIG. 1, the sealants 113a and 113b and the sealants 123a and 123b are provided such that they overlap with each other, and end portions of the sealants 113a and 113b which are in contact with the first liquid crystal 112 are substantially aligned with end portions of the sealants 123a and 123b which are in contact with the second liquid crystal 122 or are positioned closer to the inner side of the display device than the end portions of the sealants 123a and 123b.

A first display element 510 including the first pixel electrode layer 107 having a light-transmitting property, the first liquid crystal 112, and the first counter electrode layer 109 having a light-transmitting property is a transmissive liquid crystal display element and performs display in such a manner that light from a light source is made to transmit as indicated by an arrow. In addition, light transmitting through the first display element 510 passes through the coloring layer 117 serving as a color filter, whereby color display can be performed. The first display element 510 is electrically connected to the driving transistor 191.

A backlight can be used as a light source. As a light source, a cold cathode tube or a white light-emitting diode can be used. An optical member such as a reflection plate or a diffusion plate may be provided. Alternatively, a functional film such as an anti-reflection film, a polarizing film, a retardation film, a light diffusing film, or a condensing film, or a functional film including a film such as an antistatic film preventing the attachment of dust, a water repellent film suppressing the attachment of stain, or a hard coat film suppressing generation of a scratch in use may be provided.

A second display element 520 including the second pixel electrode layers 167a and 167b having a reflective property, the second liquid crystal 122, and the second counter electrode layer 169 having a light-transmitting property is a reflective liquid crystal display element. The second display element 520 performs display in such a manner that it reflects light entering the second liquid crystal 122 from the outside with the second pixel electrode layers 167*a* and 167*b* having a reflective property and extracts the light passing through the second liquid crystal 122 again to the outside. The light passes through the coloring layer 127 serving as a color filter before and after entering the second display element 520, whereby color display can be performed.

The second display element 520 is electrically connected to the driving transistor 192. Although the transistor 192 in FIG. 1 is formed as a bottom-gate transistor over a manufacturing substrate, when it is transferred to the first substrate 100, the transistor 192 is reversed upside down as illustrated in FIG. 1. Accordingly, the second pixel electrode layers 167*a* and 167*b*, the insulating film 145, the insulating film 146, and the transistor 192 are formed over the manufacturing substrate in this order, and thus the wiring layer 164*a* of the transistor 192 is electrically connected to the second pixel electrode layer 167*b* in an opening which is formed in the insulating film 145, the insulating film 146, and the gate insulating film 162 and reaches the second pixel electrode layer 167*b*.

In this specification, a layer including the transistor 191, the light-blocking film 305, the insulating film 105, and the insulating film 106 is referred to as a layer including the transistor 191, and a layer including the transistor 192, the insulating film 110, the coloring layer 117, the insulating film 165, the insulating film 146, and the insulating film 145 is referred to as a layer including the transistor 192. The layer including the transistor 192 is positioned between the first liquid crystal 112 and the second liquid crystal 122 and in contact with the first counter electrode layer 109 and the second pixel electrode layer 167*b*.

Each of the spacers 175 and 176 may be a columnar spacer or a spherical spacer. In this embodiment, an example is described in which the first display element 510 which is a transmissive display element and the second display element 520 which is a reflective display element have different thicknesses (cell gap) of the liquid crystal, and thus the heights and the sizes of the spacers are also different.

The transmissive display element and the reflective display element use different transistors and different liquid crystals although they are provided between the same pair of substrates, and thus the respective optimal materials and conditions can be selected. Furthermore, they are stacked between the pair of substrates, and thus an increase in the size of the display device can be suppressed.

Accordingly, the liquid crystal for the transmissive display element and the liquid crystal for the reflective display element can be formed using different materials, and can have different thicknesses (the thickness of a region of the liquid crystal which contributes to display in a film thickness direction of the liquid crystal). For example, the thickness of the liquid crystal of the transmissive display element using a VA mode can be greater than or equal to 3 μm and less than or equal to 5 μm, and the thickness of the liquid crystal of the reflective display element using a TN mode can be greater than or equal to 1.5 μm and less than or equal to 2.5 μm.

Thus, the cell gap of the first display element 510 which is a transmissive liquid crystal display element and the cell gap of the second display element 520 which is a reflective liquid crystal display element can be adjusted separately, and thus the design flexibility can be increased.

Alternatively, the retardation of the first display element 510 which is a transmissive liquid crystal display element and the retardation of the second display element 520 can be adjusted separately, and thus the degree of freedom of design can be increased.

It is not necessary to form a region having different cell gaps where an alignment defect is easily caused in the same liquid crystal. Thus, the aperture ratio of the second display element 520 can be increased.

In addition, different driving modes (methods) can be used for the transmissive display element and the reflective display element. For example, it is preferable that a vertical alignment (VA) mode be used as a driving mode of the transmissive display element and that a twisted nematic (TN) mode be used as a driving mode of the reflective display element. Thus, contrast can be increased. Alternatively, as a driving mode of the transmissive display element, a method using a liquid crystal material exhibiting a blue phase may be used. In either of the driving modes, liquid crystal molecules are vertically aligned with respect to a substrate in order to obtain a black display state. The use of the method and a circularly polarizing plate can increase the contrast in the both driving modes.

As a driving mode of the transmissive display element, it is possible to employ a multi-domain vertical alignment (MVA) mode, a patterned vertical alignment (PVA) mode, or the like.

Moreover, each of the transmissive display element and the reflective display element may be provided with a coloring layer serving as a color filter and a light-blocking film serving as a black matrix. The thicknesses of the coloring layers of the transmissive display element and the reflective display element can be set under the respective optimal conditions as well as the thicknesses of the liquid crystals. For example, the thickness of the coloring layer for the transmissive display element can be less than or equal to 1.5 μm, and the thickness of the coloring layer for the reflective display element can be less than or equal to 1 μm.

In the display device in FIG. 1, in consideration of uniformity of the transmittance in the display device, the thickness of the coloring layer 127 for the reflective display element through which light passes twice is set thinner than that of the coloring layer 117 for the transmissive display element through which light passes only once. However, the transmittances vary depending on the reflectance of the second pixel electrode layer having a reflective property, the intensity of external light and light of a backlight, or the like, and thus the thicknesses of the coloring layers may be adjusted as appropriate. Although a structure is employed in which the coloring layer 117 is provided between the first display element 510 which is a transmissive display element and the transistor 192, a structure may be employed in which the coloring layer 117 is provided in the same place as the coloring layer 127 (by being stacked, for example) between the second display element 520 which is a reflective display element and the second substrate 120.

One embodiment of a method for manufacturing the display device in FIG. 1 or the like is described with reference to FIGS. 2A to 2H. Note that the circularly polarizing plate, the alignment film, the pixel electrode layer, the counter electrode layer, and the like are omitted in FIGS. 2A to 2H for simplicity.

A layer 11 including a transistor for driving a transmissive display element is formed over a first substrate 10. Although not illustrated, the first pixel electrode layer is provided over the layer 11 including the transistor.

A separation layer 41 is formed over a manufacturing substrate 40.

The separation layer 41 may be formed using an organic material or an inorganic material.

First, an example in which an organic material is used for the separation layer 41 is described. As the separation layer 41, a resin layer can be used. The thickness of the resin layer is preferably greater than or equal to 0.1 µm and less than or equal to 3 µm. The resin layer can be formed in the following manner, for example. A thermosetting resin material with a low viscosity is applied to the manufacturing substrate 40 and cured by heat treatment to form the resin layer.

A thermosetting polyimide is a typical example of a material that can be used for the resin layer. It is particularly preferable to use a photosensitive polyimide. A photosensitive polyimide is a material that is suitably used for formation of a planarization film or the like of a display panel, and therefore, the formation apparatus and the material can be shared. Thus, there is no need to prepare another apparatus and another material to obtain the structure of one embodiment of the invention disclosed in this specification.

Furthermore, the resin layer that is formed using a photosensitive resin material can be processed by light exposure and development treatment. For example, an opening portion can be formed and an unnecessary portion can be removed. Moreover, by optimizing a light exposure method or light exposure conditions, an uneven shape can be formed in a surface of the resin layer. For example, an exposure technique using a half-tone mask or a gray-tone mask or a multiple exposure technique may be used.

Note that a non-photosensitive resin material may be used. In that case, a method of forming an opening portion or an uneven shape using a resist mask or a hard mask that is formed over the resin layer can be used.

In the case where the separation layer 41 is a resin layer, laser light irradiation can be employed as a method for reducing the adhesion between the manufacturing substrate 40 and the resin layer to separate them from each other. For example, it is preferable to perform the irradiation by scanning using linear laser light. By the method, the process time of the case of using a large support substrate can be shortened. As the laser light, excimer laser light with a wavelength of 308 nm can be suitably used.

Next, an example in which an inorganic material is used for the separation layer 41 is described. The separation layer 41 formed using an inorganic material is formed to have a single-layer structure or a layered structure including a layer formed of an element such as tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), or silicon (Si); or an alloy or compound material containing any of the elements as its main component by a sputtering method, a plasma CVD method, a spin coating method, a droplet discharge method, a dispensing method, a printing method, or the like. A crystalline structure of a layer containing silicon may be any one of an amorphous structure, a microcrystalline structure, or a polycrystalline structure.

If the separation layer 41 formed using an inorganic material has a single layer structure, it is preferable to form a tungsten layer, a molybdenum layer, or a layer containing a mixture of tungsten and molybdenum. Instead, a layer containing an oxide or an oxynitride of tungsten, a layer containing an oxide or an oxynitride of molybdenum, or a layer containing an oxide or an oxynitride of a mixture of tungsten and molybdenum may be formed. Note that the mixture of tungsten and molybdenum corresponds, for example, to an alloy of tungsten and molybdenum.

When the separation layer 41 formed using an inorganic material has a stacked-layer structure, it is preferable to form, as a first layer, a tungsten layer, a molybdenum layer, or a layer containing a mixture of tungsten and molybdenum, and form, as a second layer, an oxide, nitride, oxynitride, or nitride oxide layer of tungsten, molybdenum, or a mixture of tungsten and molybdenum.

Note that for separation of the manufacturing substrate 40, separation can be conducted with physical force (by a machine or the like) after making it easier for the separation layer and a semiconductor element layer to be separated from each other by conducting laser light irradiation, by etching the separation layer with a gas, a solution, or the like, and/or by mechanically removing the separation layer with a keen knife, a scalpel, or the like. The interface between the separation layer and the element layer may be permeated with a liquid, so that the element layer is separated from the substrate.

An insulating film 42 is formed over the separation layer 41.

A layer 21 including a transistor for driving a reflective display element is formed over the insulating film 42. Although not illustrated, the second pixel electrode layer is provided between the layer 21 including the transistor and the insulating film 42, and the first counter electrode layer is provided on a first liquid crystal 12 side. Sealants 13a and 13b are formed so as to surround a region filled with the liquid crystal 12, and resin layers 14a and 14b are formed so as to seal the outside of the sealants 13a and 13b. Note that the layer 21 including the transistor is extended over the sealant 13b and the resin layer 14b because there exists a terminal which is electrically connected to the outside and included in the layer 21 including the transistor. In this embodiment, the resin layers 14a and 14b are formed using a resin material having a lower viscosity than that of a material for the sealants 13a and 13b. The first liquid crystal 12 is formed over the layer 21 including the transistor and the first counter electrode layer.

Figure 2A:
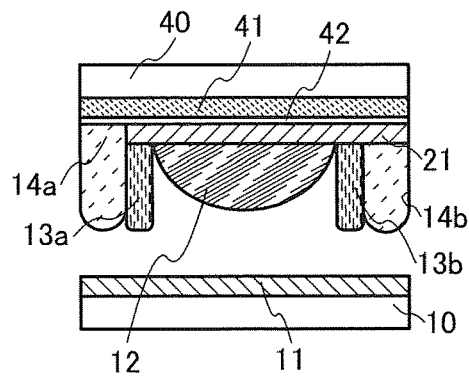
FIGS. 2A to 2H illustrate one embodiment of a method for manufacturing a display device.

The first substrate 10 over which the first pixel electrode layer and the layer 11 including the transistor are formed and the manufacturing substrate 40 over which the components up to the first liquid crystal 12 are formed are made to face each other, and the first substrate 10 and the manufacturing substrate 40 are bonded to each other such that the first liquid crystal 12 is sealed therebetween (see FIG. 2A). The sealants 13a and 13b and the resin layers 14a and 14b are cured by heat, light, or the like, so that bonding portions are firmly attached.

Note that even when bonding is performed with the first liquid crystal 12 facing downward after formation of the first liquid crystal 12 as in this embodiment, a problem in that the first liquid crystal 12 drips down does not occur. This is because the amount of the first liquid crystal 12 is very small, and bonding is performed under a reduced pressure, and thus the first liquid crystal 12 is held on the manufacturing substrate 40 side by the surface tension of the first liquid crystal 12. The same applies to a bonding process for the second liquid crystal 22. As a method for forming the first liquid crystal 12, a dispensing method (a dropping method) can be used.

Figure 2E:
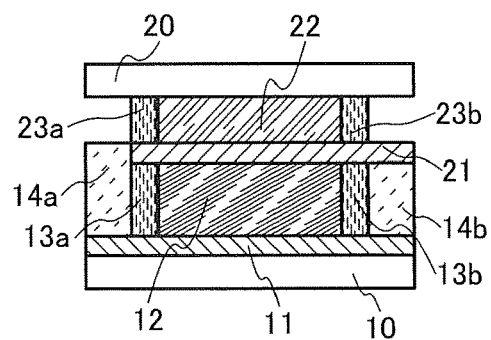
Figure 2B:
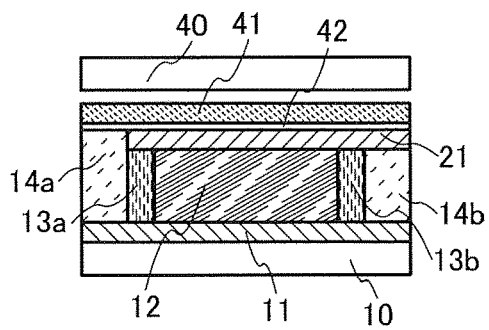

Next, the manufacturing substrate 40 is separated (see FIG. 2B). Then, the separation layer 41 and the insulating film 42 are removed to expose the second pixel electrode layer provided in contact with the layer 21 including the transistor. After that, an alignment film (not illustrated) is formed over the second pixel electrode layer (see FIG. 2C).

The sealants 23a and 23b are formed over the second substrate 20 so as to surround a region to be filled with the second liquid crystal 22, and the second liquid crystal 22 is formed.

Figure 2F:
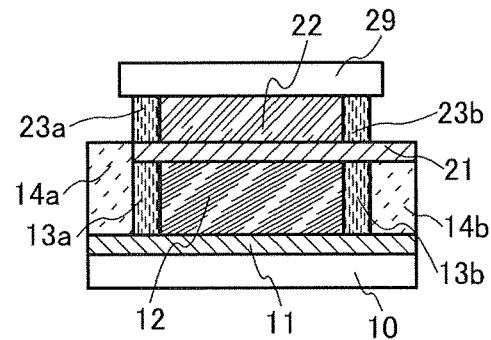
Figure 2C:
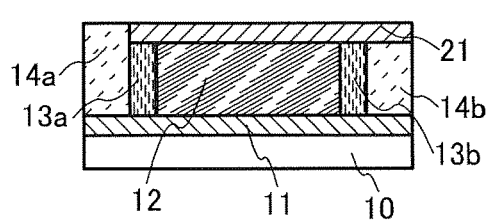
Figure 2G:
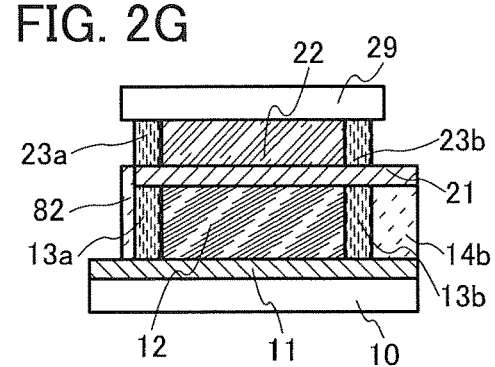
Figure 2D:
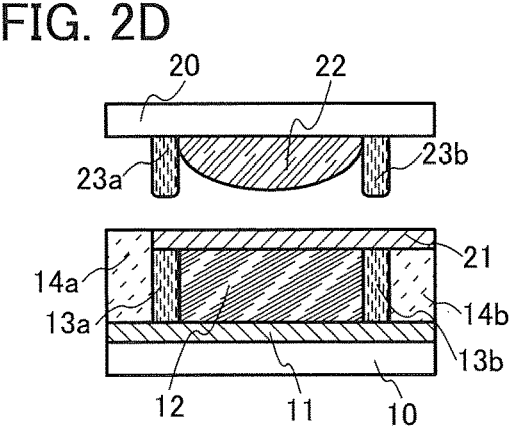
Figure 2H:
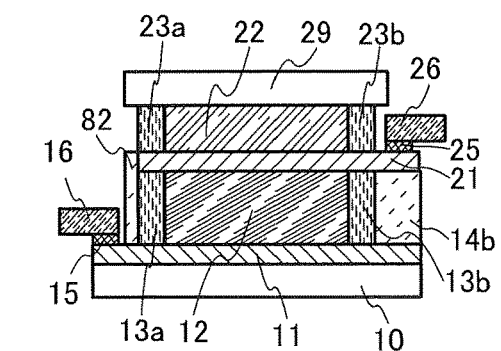

The first substrate 10 over which the layer 21 including the transistor, the second pixel electrode layer, and the alignment film are formed and the second substrate 20 over which the components up to the second liquid crystal 22 are formed are made to face each other, and the first substrate 10 and the second substrate 20 are bonded to each other such that the second liquid crystal 22 is sealed therebetween (see FIGS. 2D and 2E). The sealants 23a and 23b are cured by heat, light, or the like, so that bonding portions are firmly attached.

In the above bonding process, a force (e.g., a pressing force by pressure bonding or the like) is applied to the sealants 23a and 23b and also applied to the first liquid crystal 12 and the sealants 13a and 13b, which are provided below the sealants 23a and 23b. When the force (e.g., a pressing force by pressure bonding or the like) is applied to the first liquid crystal 12 in a state where the sealants 23a and 23b overlap with the first liquid crystal 12, the first liquid crystal 12 might be damaged, or the cell gap might be made uneven.

Accordingly, the bonding process is performed such that the sealants 13a and 13b overlap with the sealants 23a and 23b. Furthermore, the end portions of the sealants 13a and 13b which are in contact with the first liquid crystal 12 are substantially aligned with the end portions of the sealants 23a and 23b which are in contact with the second liquid crystal 22 or are positioned closer to the inner side of the display device than the end portions of the sealants 23a and 23b. With the above structure, the first liquid crystal 12 and the sealants 23a and 23b do not overlap with each other, and a force is not locally applied to the first liquid crystal 12 in the bonding process, so that damage to the first liquid crystal 12 or unevenness of the cell gap can be suppressed. The bonding process can be performed under precise conditions (an applied force and the like), so that a highly reliable display device can be manufactured with high yield.

Materials and formation conditions for the sealants 13a and 13b and the sealants 23a and 23b may be the same or different. Therefore, the heights (thicknesses) or the widths (in a direction perpendicular to the film thickness) of the sealants 13a and 13b and the sealants 23a and 23b may also be the same or different.

Alternatively, the resin layers 14a and 14b surrounding the sealants 13a and 13b may overlap with the sealants 23a and 23b.

Figure 3A:
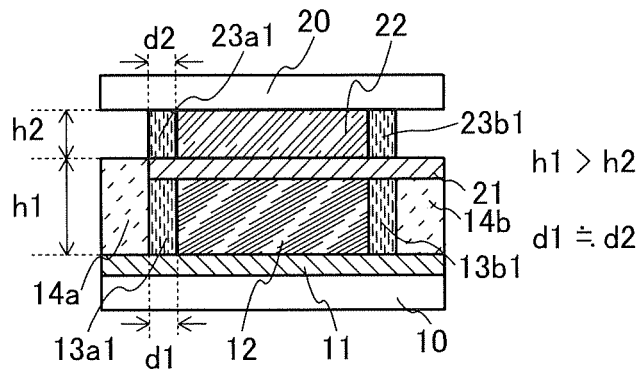
FIGS. 3A to 3C illustrate embodiments of a method for manufacturing a display device.
Figure 3B:
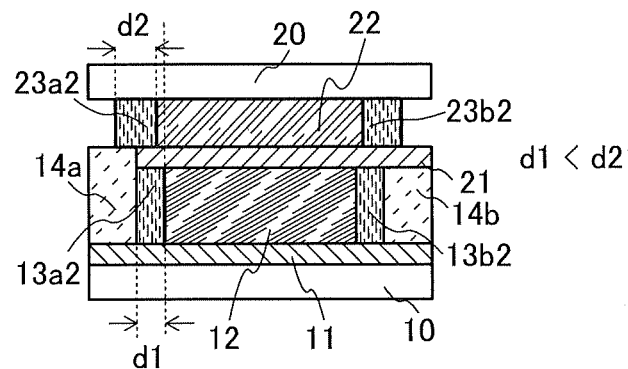
Figure 3C:
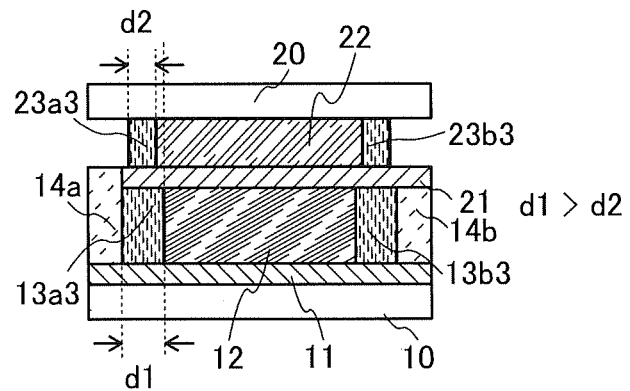

FIGS. 3A to 3C illustrate specific examples of the positional relation of the sealants 13a and 13b and the sealants 23a and 23b and shapes thereof.

Although FIGS. 3A to 3C each illustrate an example in which the height (thickness) h1 of the sealants 13a and 13b is larger than the height (thickness) h2 of the sealants 23a and 23b, the height (thickness) h1 of the sealants 13a and 13b may be smaller than the height (thickness) h2 of the sealants 23a and 23b, or they may be substantially the same.

FIG. 3A illustrates an example in which a width d1 of sealants 13a1 and 13b1 is substantially the same as a width d2 of sealants 23a1 and 23b1. In the example, end portions of the sealants 13a1 and 13b1 on the first liquid crystal 12 side are substantially aligned with end portions of the sealants 23a1 and 23b1 on the second liquid crystal 22 side. Furthermore, in the example, end portions of the sealants 13a1 and 13b1 which are not in contact with the first liquid crystal 12 are substantially aligned with end portions of the sealants 23a1 and 23b1 which are not in contact with the second liquid crystal 22.

FIG. 3B illustrates an example in which the width d1 of sealants 13a2 and 13b2 is smaller than the width d2 of sealants 23a2 and 23b2. In the example, end portions of the sealants 13a2 and 13b2 on the first liquid crystal 12 side are positioned closer to the inner side of the display device than end portions of the sealants 23a2 and 23b2 on the second liquid crystal 22 side. Furthermore, in the example, end portions of the sealants 13a2 and 13b2 which are not in contact with the first liquid crystal 12 are also positioned closer to the inner side of the display device than end portions of the sealants 23a2 and 23b2 which are not in contact with the second liquid crystal 22. The sealants 23a2 and 23b2 overlap with the resin layers 14a and 14b.

FIG. 3C illustrates an example in which the width d1 of sealants 13a3 and 13b3 is larger than the width d2 of sealants 23a3 and 23b3. In the example, end portions of the sealants 13a3 and 13b3 on the first liquid crystal 12 side are positioned closer to the inner side of the display device than end portions of the sealants 23a3 and 23b3 on the second liquid crystal 22 side. Furthermore, in the example, end portions of the sealants 13a3 and 13b3 which are not in contact with the first liquid crystal 12 are positioned closer to the outer side of the display device than end portions of the sealants 23a3 and 23b3 which are not in contact with the second liquid crystal 22.

End portions of the second substrate 20 are partly removed to form a second substrate 29 in order to facilitate connection between flexible printed circuit boards and the terminals which are electrically connected to the outside and included in the layer 11 including the transistor and the layer 21 including the transistor (see FIG. 2F).

In order to extract the terminal which is electrically connected to the outside and included in the layer 11 including the transistor, the resin layer 14a covering the terminal is partly removed and thus processed into a resin layer 82 (see FIG. 2G). A flexible printed circuit board 16 is electrically connected to the terminal included in the exposed layer 11 including the transistor through an anisotropic conductive film 15, and a flexible printed circuit board 26 is electrically connected to the terminal included in the layer 21 including the transistor through an anisotropic conductive film 25 (see FIG. 2H).

Although the transistors 191 and 192 illustrated in FIG. 1 are bottom-gate transistors, a different structure may be employed. Since the transistor for driving the transmissive display element and the transistor for driving the reflective display element are formed in different steps in the manufacturing process of the display device as illustrated in FIGS. 2A to 2H, there is no limitation on the structures, materials, and manufacturing steps of both of the transistors. Accordingly, a structure of a transistor can be freely selected depending on a display element to be driven or a circuit configuration. There is no particular limitation on the structure of the transistor which can be used for the display device disclosed in this specification. For example, a staggered type or a planar type having a top-gate structure or a bottom-gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual gate structure including two gate electrode layers placed over and below a channel region in a semiconductor film with a gate insulating layer interposed.

The bottom-gate transistors as in the display device illustrated in FIG. 1, top-gate transistors, and a combination of a bottom-gate transistor and a top-gate transistor, or a combination of a bottom-gate transistor or a top-gate transistor and a dual-gate transistor can be used.

For example, although the transistor 192 is a bottom-gate transistor in the display device in FIG. 1, the transistor 192 is reversed upside down when transferred, and thus the semiconductor film 163 is positioned on the backlight side. However, when light of the backlight enters the semiconductor film 163, electrical characteristics of the transistor may change. In the display device in FIG. 1, the light-blocking film 305 is formed between the semiconductor film 163 and the backlight using the same material and in the same process as the gate electrode layer 101 of the transistor 191 to protect the semiconductor film 163 from light of the backlight.

Figure 4:
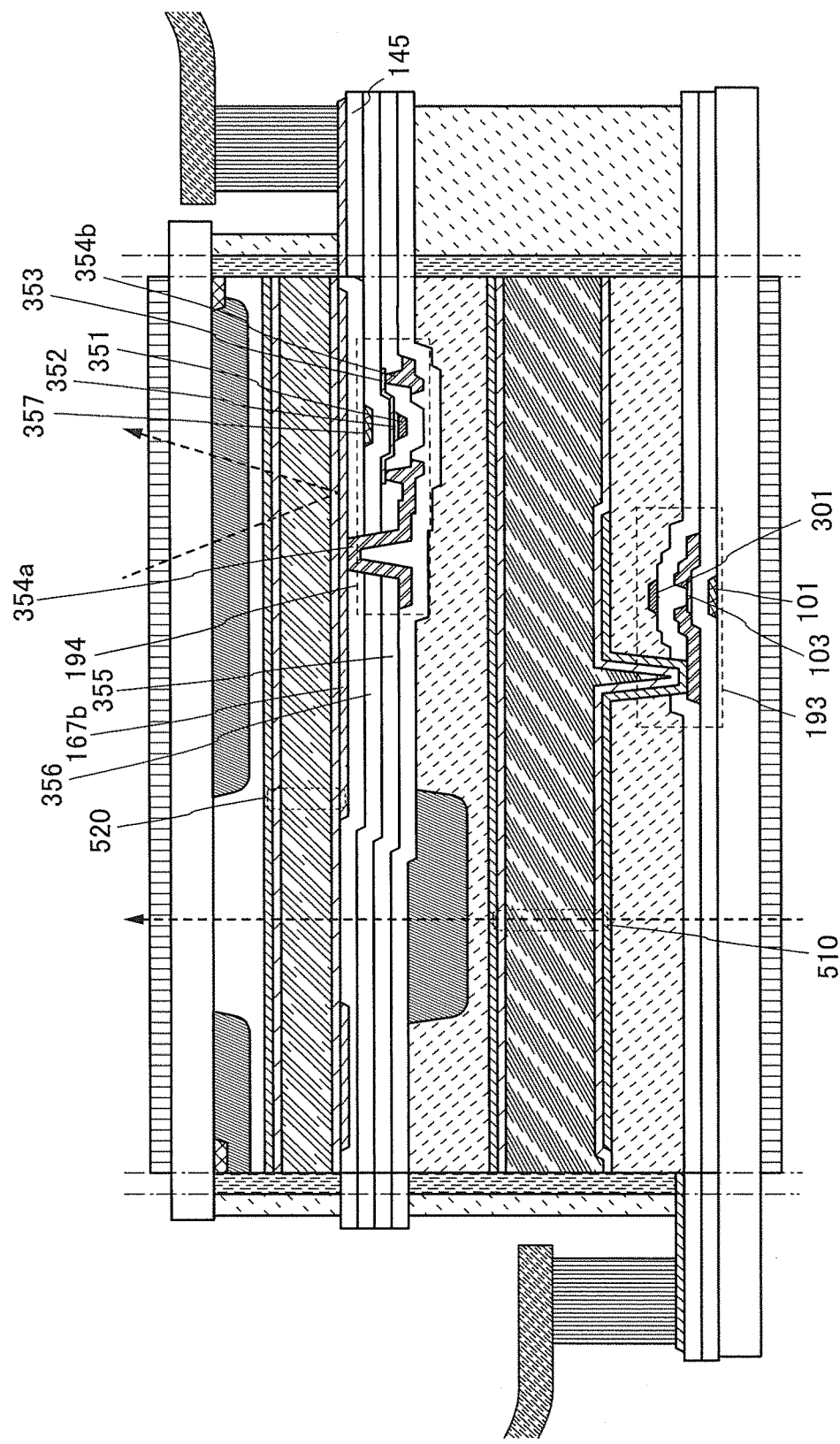
FIG. 4 illustrates one embodiment of a display device.

FIG. 4 illustrates a modification example of the display device in FIG. 1. In the display device in FIG. 4, a dual-gate transistor is used as a transistor 193 for driving the first display element 510 which is provided below and is a transmissive display element, and a dual-gate transistor having a structure different from that of the transistor 193 is used as a transistor 194 for driving the second display element 520 which is provided above and is a reflective display element.

The transistor 193 further includes a conductive layer 301 overlapping the gate electrode layer 101 and the semiconductor film 103 in addition to the components of the transistor 191 illustrated in FIG. 1.

The transistor 194 includes, over the insulating film 145, a conductive layer 357, an insulating film 356, a semiconductor film 353, a gate insulating film 352, a gate electrode layer 351, and wiring layers 354a and 354b serving as source and drain electrode layers. The wiring layer 354a is electrically connected to the second pixel electrode layer 167b in an opening formed in the insulating films 355, 356, and 145.

The conductive layer 301 may be electrically connected to the gate electrode layer 101 and have the same potential as the gate electrode layer 101 or may be independently supplied with a different potential. Similarly, the conductive layer 357 may be electrically connected to the gate electrode layer 351 and have the same potential as the gate electrode layer 351 or may be independently supplied with a different potential.

When gate electrodes are provided above and below a channel formation region of a semiconductor film in a transistor as in the transistors 193 and 194, a change in electrical characteristics of a transistor, such as a shift of the threshold voltage, can be suppressed, and in addition, higher speed operation can be performed.

Figure 5:
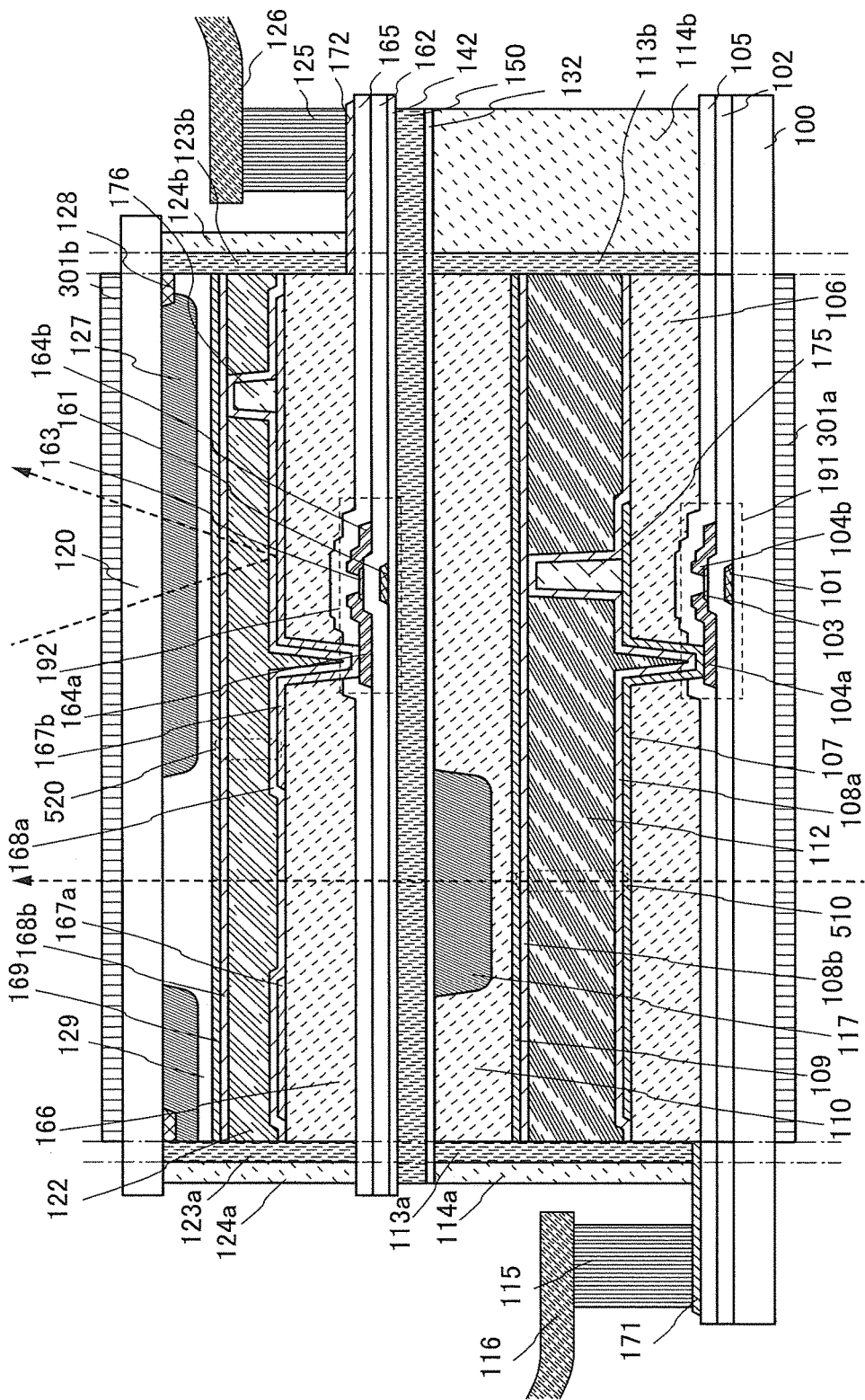
FIG. 5 illustrates one embodiment of a display device.

FIG. 5 illustrates a cross-sectional view of one embodiment of a display device. In the display device in FIG. 5, the circularly polarizing plate 301a; the first substrate 100 having a light-transmitting property; the transistor 191 including the gate electrode layer 101, the gate insulating film 102, the semiconductor film 103, and the wiring layers 104a and 104b serving as a source electrode layer and a drain electrode layer; the insulating film 105; the insulating film 106 serving as a planarization film; the first pixel electrode layer 107; the insulating film 108a serving as an alignment film; the spacer 175; the first liquid crystal 112; the insulating film 108b serving as an alignment film; the first counter electrode layer 109; the insulating film 110 serving as a planarization film; the coloring layer 117 serving as a color filter; an insulating film 132; a bonding layer 150; an insulating film 142; the transistor 192 including the gate electrode layer 161, the gate insulating film 162, the semiconductor film 163, and the wiring layers 164a and 164b serving as a source electrode layer and a drain electrode layer; the insulating film 165; the second pixel electrode layers 167a and 167b; the spacer 176; the insulating film 168a serving as an alignment film; the second liquid crystal 122; the insulating film 168b serving as an alignment film; the second counter electrode layer 169; the insulating film 129 serving as an overcoat film; the coloring layer 127 serving as a color filter; the light-blocking film 128 serving as a black matrix; the second substrate 120 having a light-transmitting property; and the circularly polarizing plate 301b are stacked. The components between the first substrate 100 and the second substrate 120 are sealed with the sealants 113a and 113b, the sealants 123a and 123b, the resin layers 114a and 114b, and the resin layers 124a and 124b. The terminal 171 electrically connected to the transistor 191 is electrically connected to the flexible printed circuit board 116 through the anisotropic conductive film 115, and a terminal 172 electrically connected to the transistor 192 is electrically connected to the flexible printed circuit board 126 through the anisotropic conductive film 125. The insulating films 132 and 142 and the bonding layer 150 are in contact with each other, and the first display element 510 which is a transmissive display element and the second display element 520 which is a reflective display element are firmly attached to each other through the bonding layer 150.

In the display device in FIG. 5, the first pixel electrode layer 107 is formed in contact with the wiring layer 104a and electrically connected to the wiring layer 104a in an opening which is formed in the insulating films 105 and 106 and reaches the wiring layer 104a. The second pixel electrode layer 167b is formed in contact with the wiring layer 164a and electrically connected to the wiring layer 164a in an opening which is formed in the insulating film 165 and an insulating film 166 and reaches the wiring layer 164a.

Although FIG. 5 shows an example of the display device in which the spacer 175 is provided between the first pixel electrode layer 107 and the insulating film 108a serving as an alignment film, the spacer 175 may be provided between the first counter electrode layer 109 and the insulating film 108b serving as an alignment film or between the insulating film 108a serving as an alignment film and the insulating film 108b serving as an alignment film. Although FIG. 5 shows an example in which the spacer 176 is provided between the first pixel electrode layer 167b and the insulating film 168a serving as an alignment film, similarly to the above, the spacer 176 may be provided between the second counter electrode layer 169 and the insulating film 168b serving as an alignment film or between the insulating film 168a serving as an alignment film and the insulating film 168b serving as an alignment film. Each of the spacers may be a columnar spacer or a spherical spacer. In this embodiment, an example is described in which the first display element 510 which is a transmissive display element and the second display element 520 which is a reflective display element have different cell gaps, and thus the heights and the sizes of the spacers are also different.

One embodiment of a method for manufacturing the display device in FIG. 5 or the like is described with reference to FIGS. 6A1, 6A2, 6B1, 6B2, 6C1, 6C2, 6D, and 6E. Note that in FIGS. 6A1 to 6E, the circularly polarizing plate, the alignment film, the pixel electrode layer, the counter electrode layer, and the like are omitted for simplicity.

The layer 11 including a transistor for driving a transmissive display element is formed over the first substrate 10. Although not illustrated, the first pixel electrode layer is provided over the layer 11 including the transistor.

A separation layer 31 is formed over a manufacturing substrate 30, and an insulating layer 32 is formed over the separation layer 31. The separation layer 31 may be formed using an organic material or an inorganic material like the separation layer 41.

Although not illustrated, the first counter electrode layer is provided over the insulating film 32. The sealants 13a and 13b are formed so as to surround a region to be filled with the liquid crystal 12, and resin layers 14a and 14b are formed so as to seal the outside of the sealants 13a and 13b. Note that the layer 11 including the transistor is extended below the sealant 13a and the resin layer 14a because there exists a terminal which is electrically connected to the outside and included in the layer 11 including the transistor. As in the case shown in FIGS. 2A to 2H, the resin layers 14a and 14b are formed using a resin material having a lower viscosity than that of a material for the sealants 13a and 13b. The first liquid crystal 12 is formed between the layer 11 including the transistor and the first counter electrode layer.

The first substrate 10 over which the first liquid crystal 12, the first pixel electrode layer, and the layer 11 including the transistor are formed and the manufacturing substrate 30 over which the first counter electrode layer is formed are made to face each other, and the first substrate 10 and the manufacturing substrate 30 are bonded to each other such that the first liquid crystal 12 is sealed therebetween (see FIG. 6A1). The sealants 13a and 13b and the resin layers 14a and 14b are cured by heat, light, or the like, so that bonding portions are firmly attached.

Note that even when the first liquid crystal 12 is formed on the manufacturing substrate 30 side and bonding is performed with the first liquid crystal 12 facing downward, a problem in that the first liquid crystal 12 drips down does not occur. This is because the amount of the first liquid crystal 12 is very small, and bonding is performed under a reduced pressure, and thus the first liquid crystal 12 is held on the manufacturing substrate 30 side by the surface tension of the first liquid crystal 12. The same applies to a bonding process for the second liquid crystal 22. As a method for forming the first liquid crystal 12, a dispensing method (a dropping method) can be used.

Next, the manufacturing substrate 30 is separated (see FIG. 6B1). Furthermore, the separation layer 31 is removed to expose the insulating film 32 (see FIG. 6C1).

The separation layer 41 is formed over the manufacturing substrate 40. After that, the insulating film 42 is formed over the separation layer 41.

The layer 21 including a transistor for driving a reflective display element is formed over the insulating film 42. Although not illustrated, the second pixel electrode layer is provided over the layer 21 including the transistor, and the second counter electrode layer is provided on the second substrate 20 side. The sealants 23a and 23b are formed so as to surround a region filled with the liquid crystal 22, and resin layers 24a and 24b are formed so as to seal the outside of the sealants 23a and 23b. Note that the layer 21 including the transistor is extended below the sealant 23b and the resin layer 24b because there exists a terminal which is electrically connected to the outside and included in the layer 21 including the transistor. In this embodiment, the resin layers 24a and 24b are formed using a resin material having a lower viscosity than that of a material for the sealants 23a and 23b. The first liquid crystal 22 is formed over the layer 21 including the transistor and the second pixel electrode layer.

The manufacturing substrate 40 over which the second liquid crystal 22, the second pixel electrode layer, and the layer 21 including the transistor are formed and the second substrate 20 over which the second counter electrode layer is formed are made to face each other, and the manufacturing substrate 40 and the second substrate 20 are bonded to each other such that the second liquid crystal 22 is sealed therebetween (see FIG. 6A2). The sealants 23a and 23b and the resin layers 24a and 24b are cured by heat, light, or the like, so that bonding portions are firmly attached.

Next, the manufacturing substrate 40 is separated (see FIG. 6B2). Furthermore, the separation layer 41 is removed to expose the insulating film 42 (see FIG. 6C2).

Note that in the method for manufacturing the display device in FIGS. 6A1 to 6E, an example is shown in which a terminal included in the exposed layer 11 including the transistor is electrically connected to the flexible printed circuit board 16 through the anisotropic conductive film 15 before separation of the manufacturing substrate 30 using the separation layer 31, and a terminal included in the layer 21 including the transistor is electrically connected to the flexible printed circuit board 26 through the anisotropic conductive film 25 before separation of the manufacturing substrate 40 using the separation layer 41. The flexible printed circuit boards may be provided after the manufacturing substrates 30 and 40 are separated using the separation layers 31 and 41 or after the transmissive display element and the reflective display element are firmly bonded to each other using a bonding layer 50.

Figure 6D:
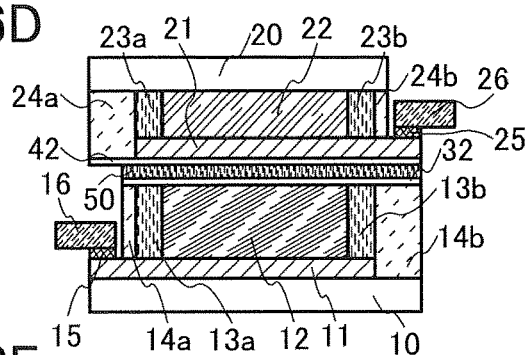

Next, the bonding layer 50 is formed between the insulating film 32 and the insulating film 42, and the insulating film 32 and the insulating film 42 are bonded to each other using the bonding layer 50 (see FIG. 6D). Through the above process, the display device in which the transmissive liquid crystal element and the reflective liquid crystal element are stacked between the first substrate 10 and the second substrate 20 with the bonding layer 50 interposed therebetween can be manufactured. Note that the bonding layer 50 has a light-transmitting property.

Note that FIG. 6D illustrates an example of the display device in which end portions of the resin layers sealing the transmissive display element are not aligned with end portions of the resin layers sealing the reflective display element and in which the resin layer 24a sealing the reflective display element overlaps with the terminal of the layer 11 including the transistor (and the flexible printed circuit board 16). As in the display device in FIG. 6E, the second substrate 20 and the resin layer 24a may be partly removed such that an end portion of the resin layer sealing the transmissive display element is aligned with an end portion of the resin layer sealing the reflective display element to form the second substrate 29 and a resin layer 81.

Another example of the method for manufacturing the display device in FIG. 5 or the like is described with reference to FIGS. 7A1, 7A2, 7B1, 7B2, 7C1, 7C2, 7D, and 7E. As in FIGS. 6A1, 6A2, 6B1, and 6B2, steps up to FIGS. 7A1 to 7B2 are performed to separate the manufacturing substrates 30 and 40. FIGS. 7A1 to 7E illustrate an example in which resin layers are used for the separation layers 31 and 41.

Next, the exposed separation layers 31 and 41 are partly removed to form resin layers 36 and 46 having a smaller thickness (see FIGS. 7C1 and 7C2). There is no particular limitation on a method for removing the separation layers 31 and 41, and a wet etching method, a dry etching method, or the like can be used. In this embodiment, the separation layers 31 and 41 are removed by ashing treatment using oxygen plasma. Ashing treatment has advantages such as high controllability, good in-plane uniformity, and high suitability for treatment using a large-sized substrate, for example.

As in FIGS. 7A1 to 7E, the resin layers used as the separation layers may be made thin and remain. Since the resin layers are made thin even when they remain, a reduction in the transmittance or an increase in the thickness of the display device can be suppressed.

Next, the bonding layer 50 is formed between the resin layer 36 and the resin layer 46, and the resin layer 36 and the resin layer 46 are bonded to each other using the bonding layer 50 (see FIG. 7D). Through the above process, the display device in which the transmissive liquid crystal element and the reflective liquid crystal element are stacked between the first substrate 10 and the second substrate 20 with the bonding layer 50 interposed therebetween can be manufactured. Note that the bonding layer 50 has a light-transmitting property.

Figure 6E:
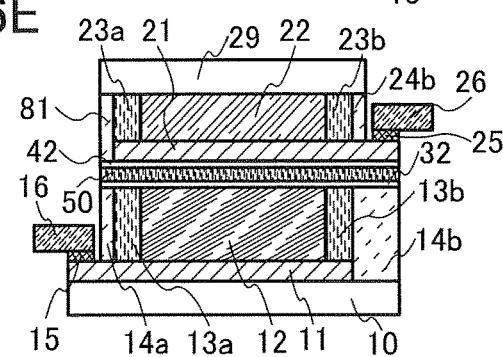

Note that as in the display device in FIG. 6E, also in the display device in FIG. 7E, the second substrate 20 and the resin layer 24a may be partly removed to form the second substrate 29 and the resin layer 81 such that the end portion of the resin layer sealing the transmissive display element is aligned with the end portion of the resin layer sealing the reflective display element.

Although the transistors 191 and 192 illustrated in FIG. 5 are bottom-gate transistors, a different structure may be employed. Since the transistor for driving the transmissive display element and the transistor for driving the reflective display element are formed in different steps in the manufacturing process of the display device as illustrated in FIGS. 6A1 to 6E, there is no limitation on the structures, materials, and manufacturing steps of both of the transistors. Accordingly, a structure of a transistor can be freely selected depending on a display element to be driven or a circuit configuration. There is no particular limitation on the structure of the transistor which can be used for the display device disclosed in this specification. For example, a staggered type or a planar type having a top-gate structure or a bottom-gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual gate structure including two gate electrode layers placed over and below a channel region in a semiconductor film with a gate insulating layer interposed.

The bottom-gate transistors as in the display device illustrated in FIG. 5, top-gate transistors, and a combination of a bottom-gate transistor and a top-gate transistor, or a combination of a bottom-gate transistor or a top-gate transistor and a dual-gate transistor can be used.

Figure 8:
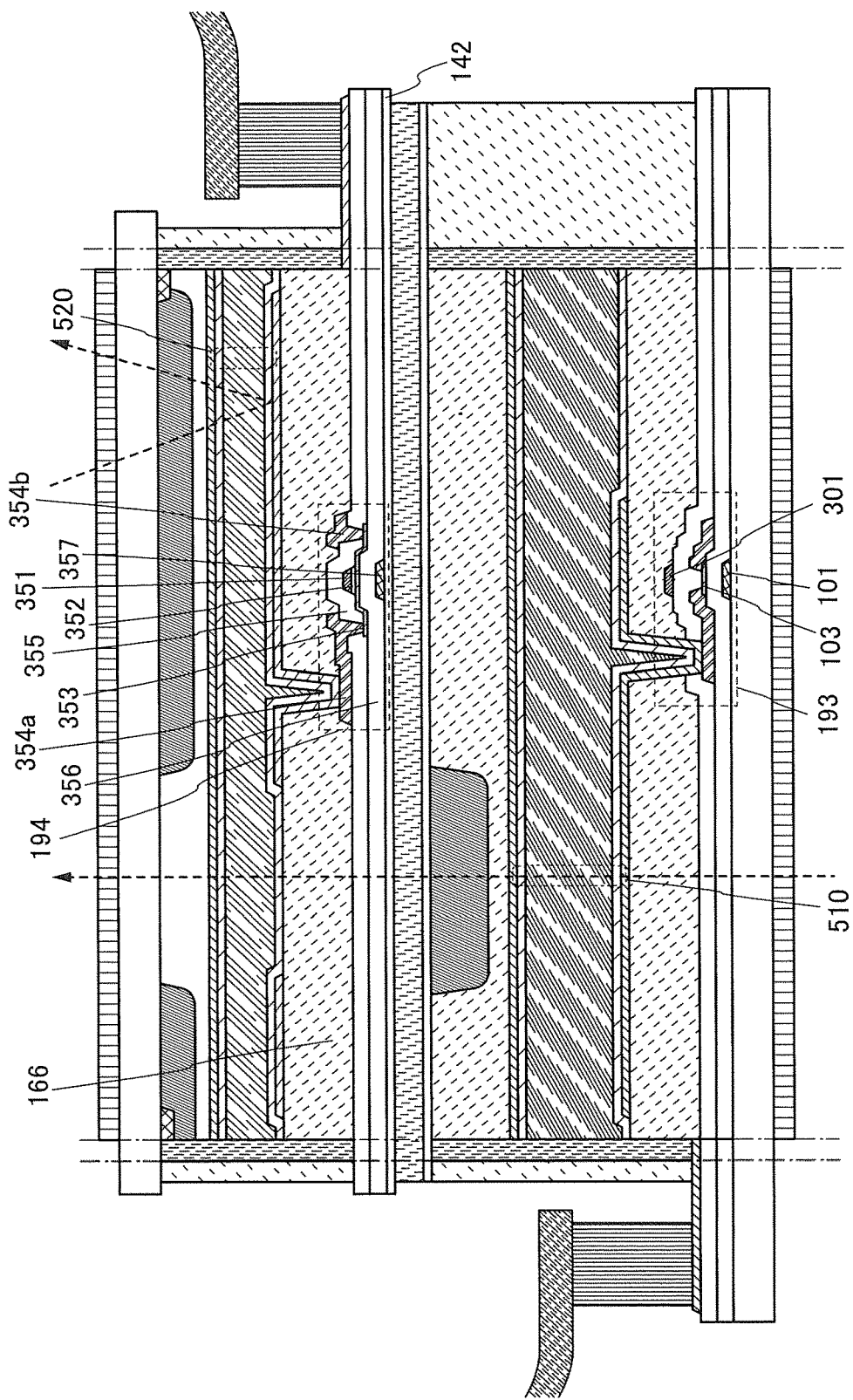
FIG. 8 illustrates one embodiment of a display device.

FIG. 8 illustrates a modification example of the display device in FIG. 5. In the display device in FIG. 8, a dual-gate transistor is used as the transistor 193 for driving the first display element 510 which is provided below and is a transmissive display element, and a dual-gate transistor having a structure different from that of the transistor 193 is used as the transistor 194 for driving the second display element 520 which is provided above and is a reflective display element.

In the transistor 193, the conductive layer 301 overlapping the gate electrode layer 101 and the semiconductor film 103 in the transistor 191 illustrated in FIG. 5 is provided.

The transistor 194 includes, over the insulating film 142, the conductive layer 357, the insulating film 356, the semiconductor film 353, the gate insulating film 352, the gate electrode layer 351, and the wiring layers 354a and 354b serving as source and drain electrode layers. The wiring layers 354a and 354b are electrically connected to the semiconductor film 353 in openings formed in the insulating film 355. Furthermore, the wiring layer 354a is electrically connected to the second pixel electrode layer 167b in an opening formed in the insulating film 166.

The electrical characteristics of the transistor might change when light of the backlight enters a channel formation region of the semiconductor film of the transistor. The conductive layer 357 has a function of protecting the channel formation region of the semiconductor film 353 from light of the backlight.

As each of the first substrates 10 and 100 and the second substrates 20 and 120, a substrate having a light-transmitting property can be used. A glass substrate such as a barium borosilicate glass substrate, an aluminoborosilicate glass substrate, a non-alkali glass substrate, a soda-lime glass substrate, a potash glass substrate, a crystal glass substrate, an aluminosilicate glass substrate, a tempered glass substrate, a chemically tempered glass substrate, or a sapphire glass substrate; a quartz substrate; a plastic substrate; a resin film; or the like can be used.

Note that aluminosilicate glass, tempered glass, chemically tempered glass, sapphire, or the like can be favorably used for the second substrates 20 and 120 that are provided on the user side of the display panel. This can prevent breakage or damage of the display panel caused by the use. A material with a thickness greater than or equal to 0.1 mm and less than or equal to 0.7 mm can be also used for the second substrates 20 and 120, for example. Specifically, a material polished to a thickness of approximately 0.1 mm can be used.

Although a material selected from the materials that can be used for the first substrates 10 and 100 and the second substrates 20 and 120 can be used for the manufacturing substrate 40, it does not need to have a light-transmitting property. For example, a metal substrate such as an aluminum substrate or a stainless steel substrate; a single crystal semiconductor substrate or a polycrystalline semiconductor substrate of silicon or silicon carbide; a compound semiconductor substrate of silicon germanium; an SOI substrate; or the like can be used as the manufacturing substrate 40.

A light-transmitting conductive film that transmits visible light can be used for each of the first pixel electrode layer 107, the first counter electrode layer 109, and the second counter electrode layer 169. For example, indium tin oxide, a conductive material in which zinc oxide (ZnO) is mixed in indium oxide, a conductive material in which silicon oxide ($SiO_2$) is mixed in indium oxide, indium oxide containing tungsten oxide, indium zinc oxide containing tungsten oxide, indium oxide containing titanium oxide, indium tin oxide containing titanium oxide, or graphene can be used. Alternatively, among the metal materials that can be used for the second pixel electrode layers 167a and 167b, the material that can form a conductive film which is made thin enough to have a light-transmitting property can be used.

A reflective conductive film that reflects visible light can be used for the second pixel electrode layers 167a and 167b. For example, the conductive film having a reflective property can be formed using one or more kinds of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), silver (Ag), or palladium (Pd); an alloy of any of these metals; and a nitride of any of these metals. The light-transmitting conductive film and the reflective conductive film may be stacked and used. Surfaces of the second pixel electrode layers 167a and 167b may be provided with a projection and a depression. In that case, incident light can be reflected in various directions so that a white image can be displayed.

As each of the first liquid crystal 112 and the second liquid crystal 122, for example, a nematic liquid crystal or a liquid crystal material that exhibits a blue phase can be used. A negative liquid crystal or a positive liquid crystal can be used. For example, a negative liquid crystal can be used for a display element of a VA mode, and a positive liquid crystal can be used for a display element of a TN mode.

As a liquid crystal material that can be used in one embodiment of the display device disclosed in this specification, for example, thermotropic liquid crystal, low-molecular liquid crystal, high-molecular liquid crystal, polymer dispersed liquid crystal, ferroelectric liquid crystal, anti-ferroelectric liquid crystal, or the like can be used. Alternatively, a liquid crystal material which exhibits a cholesteric phase, a smectic phase, a cubic phase, a chiral nematic phase, an isotropic phase, or the like can be used.

Specifically, a liquid crystal material including a polymer network can be used for the first liquid crystal 112 and the second liquid crystal 122. For example, a composite material including a liquid crystal material and a polymer that is phase-separated from the liquid crystal material can be used for the first liquid crystal 112 and the second liquid crystal 122. Specifically, by photopolymerization of a mixture including a monomer and a liquid crystal material, a polymer that is phase-separated from the liquid crystal material can be formed.

For the insulating films 108a, 108b, 168a, and 168b serving as an alignment film, a material including polyimide or the like can be used. Specifically, a material formed by rubbing treatment or an optical alignment technique such that a liquid crystal material has a predetermined alignment can be used.

For example, a film containing soluble polyimide can be used as each of the insulating films 108a, 108b, 168a, and 168b serving as an alignment film. In this case, the temperature required in forming the insulating films 108a, 108b, 168a, and 168b serving as alignment films can be made low. As a result, damage to the other components caused when the insulating films 108a, 108b, 168a, and 168b serving as alignment films are formed can be reduced.

Spacers that support gaps for the first liquid crystal 112 and the second liquid crystal 122 may be provided. As the spacer, a columnar spacer or a spherical spacer can be used. In each of the display devices in FIG. 1 and FIG. 5, columnar spacers are used as the spacers 175 and 176. The spacer 175 is provided between the first pixel electrode layer 107 and the insulating film 108a serving as an alignment film. In the display device illustrated in FIG. 1, the spacer 176 is provided between the second counter electrode layer 169 and the insulating film 168b serving as an alignment film.

In the display device illustrated in FIG. 5, the spacer 176 is provided between the second pixel electrode layer 167b and the insulating film 168a serving as an alignment film.

For example, an organic material, an inorganic material, or a composite material of an organic material and an inorganic material can be used for the spacer. Specifically, polyester, polyolefin, polyamide, polyimide, polycarbonate, polysiloxane, an acrylic resin, or the like, or a composite material of a plurality of kinds of resins selected from these, or the like can be used for the spacer. Alternatively, a photosensitive material may be used.

An inorganic material, an organic material, a composite material of an inorganic material and an organic material, or the like can be used for the sealants 13a, 13b, 113a, 113b, 123a, and 123b. For example, an organic material such as a thermally fusible resin or a curable resin can be used for the sealants 13a, 13b, 113a, 113b, 123a, and 123b.

For example, an organic material such as a reactive curable adhesive, a light curable adhesive, a thermosetting adhesive, and/or an anaerobic adhesive can be used for the sealant 13a, 13b, 113a, 113b, 123a, and 123b.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used for the sealants 13a, 13b, 113a, 113b, 123a, and 123b.

For example, the materials that can be used for the sealants 13a, 13b, 113a, 113b, 123a, and 123b can be used for the resin layers 14a, 14b, 114a, 114b, 124a, and 124b.

Any material that has a light-transmitting property can be used for the bonding layers 50 and 150, and a light-transmitting material that can be used for the sealants 13a, 13b, 113a, 113b, 123a, and 123b and the resin layers 14a, 14b, 114a, 114b, 124a, and 124b can be used.

An insulating inorganic material, an insulating organic material, or an insulating composite material containing an inorganic material and an organic material can be used for the insulating films 105, 106, 110, 165, 146, 145, 129, 355, or the like.

The light-blocking layer 128 is formed using a light-blocking material which reflects or absorbs light. For example, a black organic resin can be used, which can be formed by mixing a black resin of a pigment material, carbon black, titanium black, or the like into a resin material such as photosensitive or non-photosensitive polyimide. Alternatively, a light-blocking metal film can be used, which is made of chromium, molybdenum, nickel, titanium, cobalt, copper, tungsten, or aluminum, for example.

As the chromatic light-transmitting resin that can be used for the coloring layers 117 and 127, a photosensitive organic resin or a non-photosensitive organic resin can be used. A photosensitive organic resin layer is preferably used because the number of resist masks can be reduced and the process can be simplified.

Chromatic colors are colors except chromatic colors such as black, gray, and white. Each of the coloring layers 117 and 127 is formed using a material which transmits only light of a chromatic color with which the material is colored in order to function as a color filter. As chromatic color, red, green, blue, or the like can be used. Cyan, magenta, yellow, or the like may also be used. "Transmitting only the chromatic light" means that light transmitted through the coloring layer has a peak at the wavelength of the chromatic light. The thickness of each of the coloring layers 117 and 127 is controlled as appropriate in consideration of the relation between the concentration of a coloring material to be included and the transmittance of light.

The gate electrode layer 101, the gate electrode layer 161, the gate electrode layer 351, the conductive layer 301, the light-blocking film 305, the conductive layer 357, the wiring layer 104a, the wiring layer 104b, the wiring layer 164a, the wiring layer 164b, the terminal 171, and the terminal 172 can be formed with a single-layer or a stacked-layer using a metal material such as molybdenum, titanium, tantalum, tungsten, aluminum, copper, neodymium, or scandium; or an alloy material which contains any of these materials as a main component. The gate electrode layers 101, 161, and 351 can also be formed using a conductive material such as indium oxide-tin oxide, indium oxide containing tungsten oxide, indium zinc oxide containing tungsten oxide, indium oxide containing titanium oxide, indium tin oxide containing titanium oxide, indium oxide-zinc oxide, or indium tin oxide to which silicon oxide is added. Moreover, a stacked-layer structure of the above conductive material and the above metal material can be employed.

The gate insulating films 102 and 162 and the insulating films 105, 106, 110, 129, 145, 146, 165, 355, and 356 can be formed by a sputtering method, a CVD method, or the like as appropriate. The gate insulating films 102 and 162 and the insulating films 105, 106, 110, 129, 145, 146, 165, 355, and 356 can be formed using a silicon oxide film, a gallium oxide film, a gallium zinc oxide film, a zinc oxide film, an aluminum oxide film, a silicon nitride film, a silicon oxynitride film, an aluminum oxynitride film, or a silicon nitride oxide film. When the gate insulating film is formed using a high-k material such as hafnium oxide, yttrium oxide, hafnium silicate ($HfSi_xO_y$(x>0, y>0)), hafnium silicate to which nitrogen is added ($HfSiO_xN_y$ (x>0, y>0)), hafnium aluminate ($HfAl_xO_y$, >0, y>0)), or lanthanum oxide, gate leakage current can be reduced. Furthermore, the gate insulating films 102 and 162 may have either a single-layer structure or a stacked-layer structure.

The insulating films 106, 110, and 129 serving as planarization insulating films can also be formed using an organic material such as polyimide or acrylic by a wet process such as a spin coating method or a printing method. Other than such organic materials, it is also possible to use a low-dielectric constant material (low-k material) or the like. Note that the planarization insulating film may be formed by stacking a plurality of insulating films formed using any of these materials.

A semiconductor including an element belonging to Group 14 can be used for the semiconductor films 103 and 163. Specifically, a semiconductor containing silicon can be used for the semiconductor films. For example, single crystal silicon, polysilicon, microcrystalline silicon, amorphous silicon, or the like can be used.

Alternatively, a compound semiconductor such as a semiconductor containing gallium arsenide can be used.

Further alternatively, an organic semiconductor such as an organic semiconductor containing any of polyacenes and graphene can be used.

For example, an oxide semiconductor such as an oxide semiconductor containing indium or an oxide semiconductor containing indium, gallium, and zinc can be used.

A transistor including an oxide semiconductor in a semiconductor film has an advantage of low off-state leakage current. Thus, a pixel circuit can hold an image signal for a longer time. Specifically, a selection signal can be supplied at a frequency of lower than 30 Hz, preferably lower than 1 Hz, further preferably less than once per minute while flickering is suppressed. Consequently, eyestrain on a user of an information processing device can be reduced, and power consumption for driving can be reduced.

Since the transmissive display element and the reflective display element in each of which the material and the thickness are optimized can be each driven by a transistor having required excellent electrical and physical characteristics as described above, a display device having high-image quality and high performance can be provided. In addition, since the transmissive display element and the reflective display element are stacked between a pair of substrates, an increase in the size of the display device can be suppressed. Moreover, a highly reliable display device can be manufactured with high yield.

Note that in the display device in this embodiment, power consumption can be reduced using a reflective display element. In addition, an image with high contrast can be favorably displayed in an environment with bright external light. Furthermore, an image can be favorably displayed using a transmissive display element which controls transmission of light and a backlight or the like in a dark environment. Moreover, since the insulating film is provided between the transmissive display element and the reflective display element, impurity diffusion between the transmissive display element and the reflective display element can be suppressed using the insulating film. Consequently, a novel display device that is highly convenient or reliable can be provided.

This embodiment can be implemented in an appropriate combination with any of the structures described in the other embodiments.

Embodiment 2

One embodiment of a method for manufacturing the display device in FIG. 1 or the like is described with reference to FIGS. 9A to 9G. Note that in FIGS. 9A to 9G, the circularly polarizing plate, the alignment film, the pixel electrode layer, the counter electrode layer, and the like are omitted for simplicity. The method in this embodiment is a modification example of the manufacturing method illustrated in FIGS. 2A to 2H in Embodiment 1. Accordingly, portions which are the same as or have functions similar to those in Embodiment 1 are denoted by the same reference numerals in different drawings, and Embodiment 1 can be referred to for the portions; therefore, descriptions thereof are not repeated.

As described with reference to FIGS. 2A and 2B in Embodiment 1, using the sealants 13a and 13b and the resin layers 14a and 14b, the first substrate 10 over which the first pixel electrode layer and the layer 11 including the transistor are formed and the manufacturing substrate 40 over which the components up to the first liquid crystal 12 are formed are bonded to each other such that the first liquid crystal 12 is sealed therebetween. By curing the sealants 13a and 13b and the resin layers 14a and 14b by heat, light, or the like, bonding portions are firmly attached, and then the manufacturing substrate 40 is separated (see FIG. 9A).

In this embodiment, a layer 61 including a transistor for driving the reflective display element includes a terminal 62 which penetrates the insulating film 42 and is provided in a depression of a resin layer 63 serving as a separation layer.

In this embodiment, an example is described in which a photosensitive organic material is used for the separation layer and processed into the resin layer 63 having the depression by a photolithography step using a multi-tone mask. The use of a multi-tone mask can reduce the number of light-exposure masks, and the number of corresponding photolithography steps can also be reduced, whereby simplification of the process can be realized.

The insulating film 42 is formed over the resin layer 63 having the depression and is processed by etching treatment such that the depression is exposed. After that, the terminal 62 is formed in the layer 61 including the transistor so as to be in contact with the depression of the resin layer 63.

A release layer 70 which covers the terminal included in the layer 11 including the transistor for driving the transmissive display element is formed. The resin layer 14a used in a bonding process is provided over the release layer 70.

The release layer 70 is used to selectively remove only part of the resin layer 14a provided over the release layer 70.

As a material that can be used for the release layer 70, a material having a water contact angle of more than or equal to 90° and less than or equal to 180° or a material containing a fluorine-containing group, specifically, a high molecular compound whose side chain has a perfluoroalkyl group, an acrylic resin whose side chain has a perfluoroalkyl group, a meta-acrylic resin whose side chain has a perfluoroalkyl group, or the like can be used. For example, a high molecular compound containing a perfluoroalkyl group in which the number of carbon atoms is more than or equal to 4 and less than or equal to 12, preferably more than or equal to 6 and less than or equal to 12 can be used. A film which contains an organic compound having a perfluoroalkyl group and has a thickness of 2 μm or less, preferably 0.3 μm or less, further preferably 0.1 μm or less can be used for the release layer 70, for example.

After the manufacturing substrate 40 is separated, part of the exposed resin layer 63 is removed to expose the terminal 62 and form a resin layer 46 having a smaller thickness (see FIG. 9B). There is no particular limitation on a method for removing the resin layer 63, and a wet etching method, a dry etching method, or the like can be used. In this embodiment, the resin layer 63 is removed by ashing treatment using oxygen plasma. Ashing treatment has advantages such as high controllability, good in-plane uniformity, and high suitability for treatment using a large-sized substrate, for example.

A top surface of the resin layer 46 having a smaller thickness is subjected to rubbing treatment. Thus, the resin layer 46 can be used as an insulating film 48 serving as an alignment film. When the first substrate 10 is slid as indicated by an arrow in FIG. 9C in a state where a rotating rubbing roller 47 is pressed against the resin layer 46, uniaxial alignment treatment can be performed on the resin layer 46.

Note that although an example in which the resin layer 63 is thinned and used as an alignment film is described here, the planarity of a surface of the resin layer 63 may be reduced when the resin layer 63 is thinned. In that case, after the resin layer 63 is removed in the process of thinning the resin layer 63, another resin or the like serving as an alignment film may be formed. Then, the resin or the like is subjected to rubbing treatment, so that an alignment film can be formed.

The sealants 23a and 23b are formed over the second substrate 20 so as to surround a region to be filled with the second liquid crystal 22, and the second liquid crystal 22 is formed.

The first substrate 10 over which the layer 11 including the transistor, the second pixel electrode layer, and the alignment film are formed and the second substrate 20 over which the components up to the second liquid crystal 22 are formed are made to face each other, and the first substrate 10 and the second substrate 20 are bonded to each other such that the second liquid crystal 22 is sealed therebetween (see FIGS. 9D and 9E). The sealants 23a and 23b are cured by heat, light, or the like, so that bonding portions are firmly attached.

End portions of the second substrate 20 are partly removed to form the second substrate 29 in order to facilitate connection between flexible printed circuit boards and the terminals which are electrically connected to the outside and included in the layer 11 including the transistor and the layer 61 including the transistor.

An opening 71 is formed in a region where the resin layer 14a, the insulating film 42, and the insulating film 48 serving as an alignment film overlap with the release layer 70. For example, an adhesive tape is attached to the region where the resin layer 14a, the insulating film 42, and the insulating film 48 serving as an alignment film overlap with the release layer 70 and is separated. Thus, only the region where the resin layer 14a, the insulating film 42, and the insulating film 48 serving as an alignment film overlap with the release layer 70 can be selectively removed together with the adhesive tape, so that the opening 71 can be formed in the resin layer 14a, the insulating film 42, and the insulating film 48 serving as an alignment film. As a result, a resin layer 83, an insulating film 84, and an alignment film 85 which have the opening 71 reaching the release layer 70 can be formed (see FIG. 9F).

The anisotropic conductive film 15 is formed in the opening 71, and the flexible printed circuit board 16 is electrically connected through the anisotropic conductive film 15 to the terminal included in the layer 11 including the transistor. Although the release layer 70 remains in the opening 71, it is removed or broken by conductive particles contained in the anisotropic conductive film 15 when the anisotropic conductive film 15 is subjected to pressure bonding, and thus the terminal and the flexible printed circuit 16 can be electrically connected to each other. Note that the release layer 70 may be removed before formation of the anisotropic conductive film 15.

The flexible printed circuit 26 is electrically connected through the anisotropic conductive film 25 to the exposed terminal 62 included in the layer 61 including the transistor (see FIG. 9G).

Since the transmissive display element and the reflective display element in each of which the material and the thickness are optimized can be each driven by a transistor having required excellent electrical and physical characteristics as described above, a display device having high-image quality and high performance can be provided. In addition, since the transmissive display element and the reflective display element are stacked between a pair of substrates, an increase in the size of the display device can be suppressed.

Note that in the display device in this embodiment, power consumption can be reduced using a reflective display element. In addition, an image with high contrast can be favorably displayed in an environment with bright external light. Furthermore, an image can be favorably displayed using a transmissive display element which controls transmission of light and a backlight or the like in a dark environment. Moreover, since the insulating film is provided between the transmissive display element and the reflective display element, impurity diffusion between the transmissive display element and the reflective display element can be suppressed using the insulating film. Consequently, a novel display device that is highly convenient or reliable can be provided.

This embodiment can be implemented in an appropriate combination with any of the structures described in the other embodiments.

Embodiment 3

In this embodiment, a structure of a data processing device of one embodiment of the invention disclosed in this specification is described with reference to FIGS. 10A to 10C, FIGS. 11A and 11B, and FIG. 12.

Figure 10A:
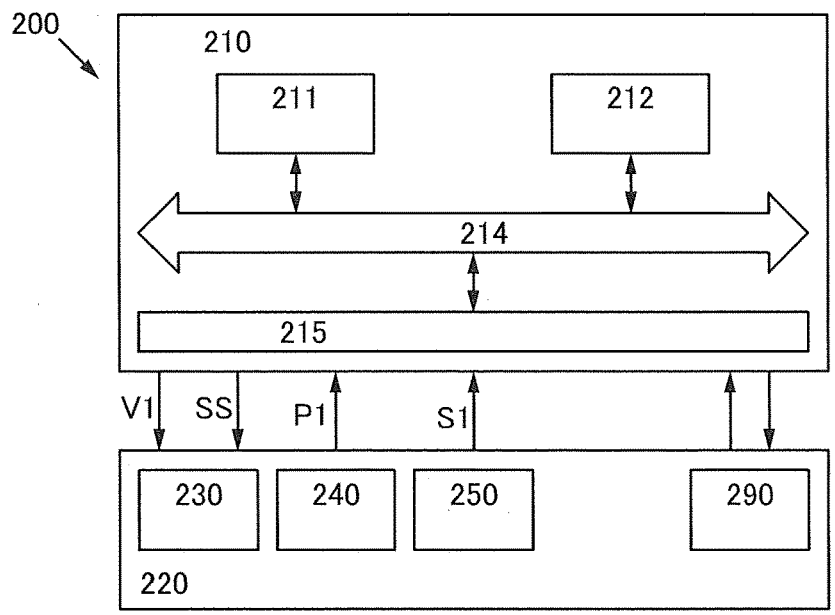
FIG. 10A is a block diagram and FIGS. 10B and 10C are projection views each illustrating a structure of a data processing device.
Figure 10B:
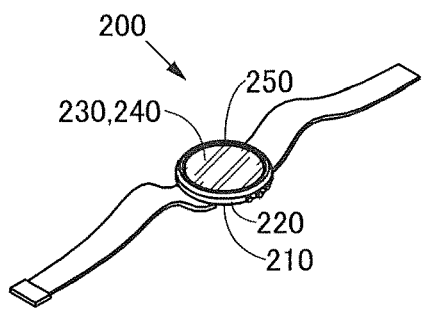
Figure 10C:
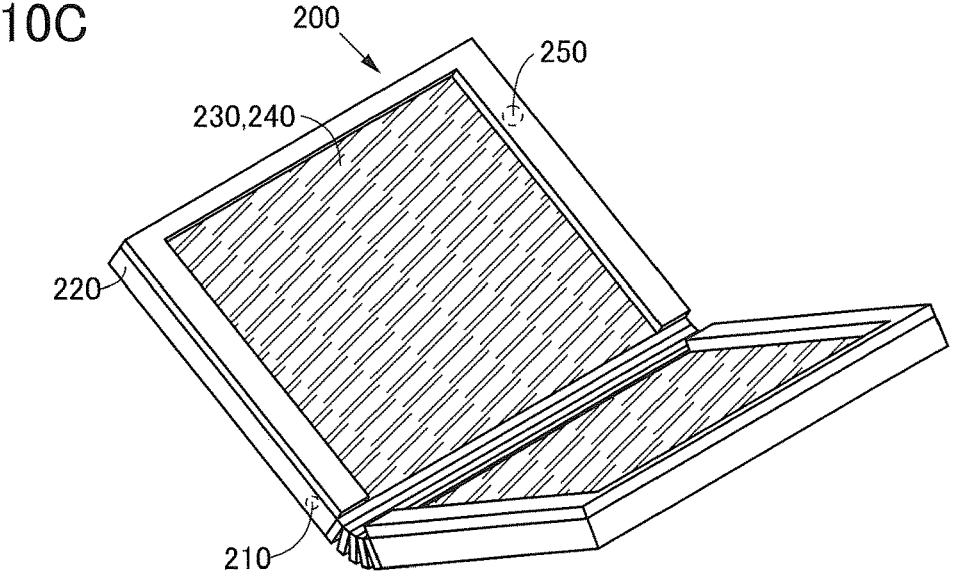

FIG. 10A is a block diagram illustrating a structure of a data processing device of one embodiment of the invention disclosed in this specification. FIGS. 10B and 10C are projection views illustrating examples of external views of a data processing device 200.

Figure 11A:
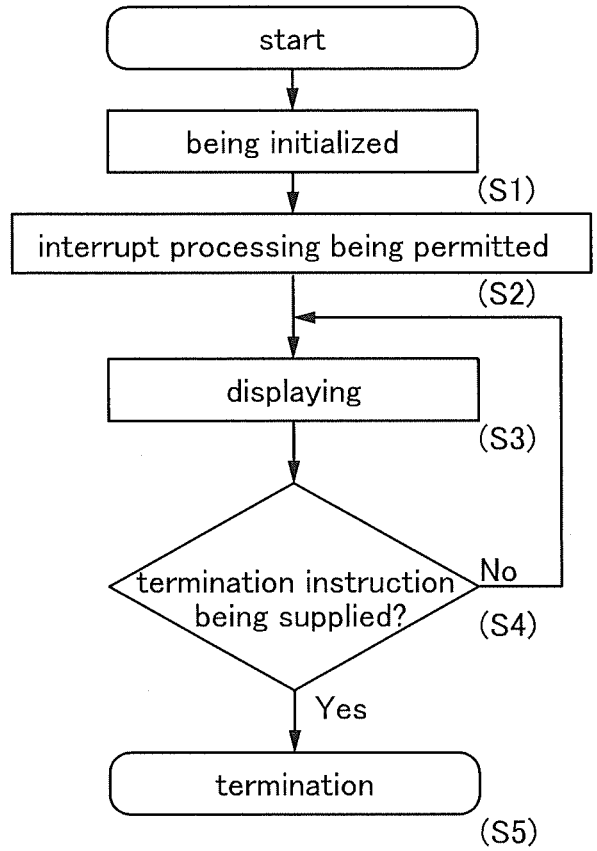
FIGS. 11A and 11B are each a flow chart illustrating a method for driving a data processing device.
Figure 11B:
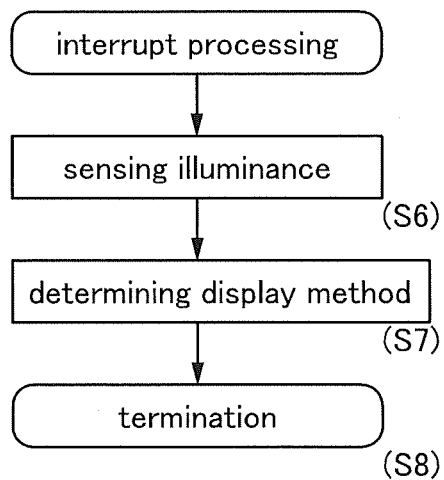

FIGS. 11A and 11B are flow charts illustrating a program of one embodiment of the invention disclosed in this specification. FIG. 11A is a flow chart showing main processing of the program of one embodiment of the invention disclosed in this specification, and FIG. 11B is a flow chart showing interrupt processing.

Figure 12:
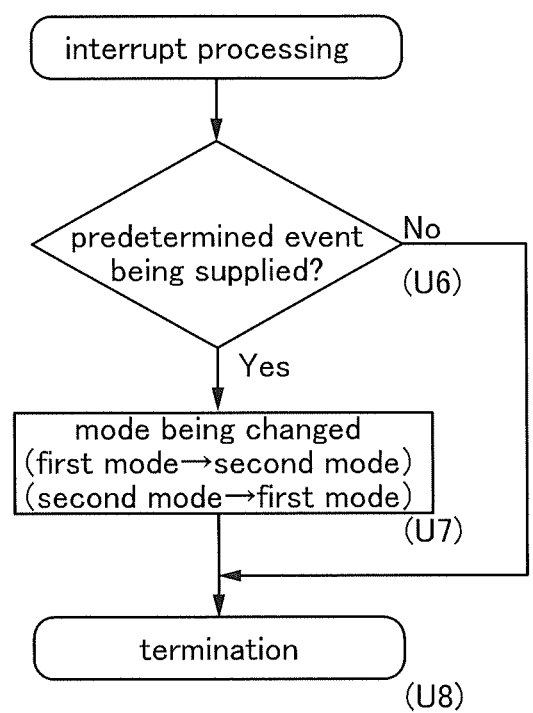
FIG. 12 is a flow chart illustrating a method for driving a data processing device.

FIG. 12 is a flow chart illustrating interrupt processing of a program of one embodiment of the invention disclosed in this specification.

<Structure Example 1 of Data Processing Device>

The data processing device 200 described in this embodiment includes an input/output device 220 and an arithmetic device 210 (see FIG. 10A). The input/output device 220 is electrically connected to the arithmetic device 210. The data processing device 200 can include a housing (see FIG. 10B or 10C).

The input/output device 220 includes a display portion 230 and an input portion 240 (see FIG. 10A). The input/output device 220 includes a sensor portion 250. The input/output device 220 can include a communication portion 290.

The input/output device 220 has a function of receiving image data V1 or control data SS and a function of supplying positional data P1 or sensing data S1.

The arithmetic device 210 has a function of receiving the positional data Pb or the sensing data S1. The arithmetic device 210 has a function of supplying the image data V1. For example, the arithmetic device 210 has a function of operating on the basis of the positional data P1 or the sensing data S1.

Note that the housing has a function of storing the input/output device 220 or the arithmetic device 210. Alternatively, the housing has a function of supporting the display portion 230 or the arithmetic device 210.

The display portion 230 has a function of displaying an image on the basis of the image data V1. The display portion 230 has a function of displaying an image on the basis of the control data SS.

The input portion 240 has a function of supplying the positional data P1.

The sensor portion 250 has a function of supplying the sensing data S1. The sensor portion 250 has a function of sensing the illuminance of the environment where the data processing device 200 is used and a function of supplying illuminance data, for example. The sensor portion 250 has a function of sensing the chromaticity of ambient light in the environment where the data processing device 200 is used and a function of supplying illuminance data, for example.

Thus, the data processing device can identify the intensity of light received by the housing of the data processing device and operate under a usage environment. As a result, a novel data processing device with high convenience or high reliability can be provided.

Accordingly, the user of the data processing device can select a display method. Specifically, when a display method using a reflective display element is selected, power consumption can be reduced, for example. Alternatively, when a display method using a transmissive display element is selected, display can be performed in a dark place, for example. Further alternatively, when a display method using a reflective display element and a transmissive display element is selected, a clear image of a caption or the like can be displayed using the transmissive display element so as to be superimposed on an image displayed using the reflective display element. As a result, a novel data processing device with high convenience or high reliability can be provided.

Individual components included in the data processing device will be described below. Note that these components cannot be clearly distinguished and one component may also serve as another component or include part of another component. For example, a touch panel in which a touch sensor is provided so as to overlap with a display panel serves as an input portion as well as a display portion.

<<Structure Example>>

The data processing device 200 of one embodiment of the invention disclosed in this specification includes a housing or the arithmetic device 210.

The arithmetic device 210 includes an arithmetic portion 211, a memory portion 212, a transmission path 214, or an input/output interface 215.

The data processing device of one embodiment of the invention disclosed in this specification includes the input/output device 220.

The input/output device 220 includes the display portion 230, the input portion 240, the sensor portion 250, and the communication portion 290.

<<Data Processing Device>>

The data processing device of one embodiment of the invention disclosed in this specification includes the arithmetic device 210 or the input/output device 220.

<<Arithmetic Device 210>>

The arithmetic device 210 includes the arithmetic portion 211 and the memory portion 212. The arithmetic device 210 further includes the transmission path 214 and the input/output interface 215.

<<Arithmetic Portion 211>>

The arithmetic portion 211 is configured to, for example, execute a program.

<<Memory Portion 212>>

The memory portion 212 has a function of, for example, storing the program executed by the arithmetic portion 211, initial data, setting data, an image, or the like.

Specifically, a hard disk, a flash memory, a memory including a transistor including an oxide semiconductor, or the like can be used for the memory portion 212.

<<Input/Output Interface 215, Transmission Path 214>>

The input/output interface 215 includes a terminal or a wiring and is configured to supply and receive data. For example, the input/output interface 215 can be electrically connected to the transmission path 214 and the input/output device 220.

The transmission path 214 includes a wiring and is configured to supply and receive data. For example, the transmission path 214 can be electrically connected to the input/output interface 215. In addition, the transmission path 214 can be electrically connected to the arithmetic portion 211, the memory portion 212, or the input/output interface 215.

<<Input/Output Device 220>>

The input/output device 220 includes the display portion 230, the input portion 240, the sensor portion 250, or the communication portion 290.

<<Display Portion 230>>

The display portion 230 includes a control portion, a driving circuit GD, a driving circuit SD, and a display panel. For example, the display device described in Embodiment 1 or 2 can be used as the display portion 230.

<<Input Portion 240>>

A variety of human interfaces or the like can be used as the input portion 240 (see FIG. 10A to 10C).

For example, a keyboard, a touch sensor, a microphone, a camera, or the like can be used as the input portion 240. Note that a touch sensor having a region overlapping with the display portion 230 can be used. An input/output device that includes the display portion 230 and a touch sensor having a region overlapping with the display portion 230 can be referred to as a touch panel or a touch screen.

For example, a user can make various gestures (e.g., tap, drag, swipe, and pinch in) using his/her finger as a pointer on the touch panel.

The arithmetic device 210, for example, analyzes data on the position, track, or the like of the finger on the touch panel and determines that a specific gesture is supplied when the analysis results meet predetermined conditions. Therefore, the user can supply a predetermined operation instruction associated with a predetermined gesture by using the gesture.

For instance, the user can supply a "scrolling instruction" for changing a portion where image data is displayed by using a gesture of touching and moving his/her finger on the touch panel.

<<Sensor Portion 250>>

The sensor portion 250 has a function of sensing the surroundings and supplying the sensing data such as illuminance data, attitude data, pressure data, and positional data.

For example, a photosensor, an attitude sensor, an acceleration sensor, a direction sensor, a global positioning system (GPS) signal receiving circuit, a pressure sensor, a temperature sensor, a humidity sensor, a camera, or the like can be used as the sensor portion 250.

<<Communication Portion 290>>

The communication portion 290 is configured to supply and acquire data to/from a network.

<<Program>>

The program of one embodiment of the invention disclosed in this specification has the following steps (see FIG. 11A).

[First Step]

In a first step, setting is initialized (see S1 in FIG. 11A).

For example, predetermined image data which is to be displayed on start-up and data for identifying a predetermined mode of displaying the image data and a predetermined method of displaying the image data are acquired from the memory portion 212. Specifically, one still image data or another moving image data can be used as the predetermined image data. Furthermore, a first mode or a second mode can be used as the predetermined mode. Furthermore, a first display method, a second display method, or a third display method can be used as the predetermined display method.

[Second Step]

In the second step, interrupt processing is permitted (see S2 in FIG. 11A). Note that an arithmetic device allowed to execute the interrupt processing can perform the interrupt processing in parallel with the main processing. The arithmetic device that has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

[Third Step]

In a third step, image data is displayed in the predetermined mode or the predetermined display method selected in the first step or the interrupt processing (see S3 in FIG. 11A). Note that the predetermined mode identifies a mode for displaying the image data, and the predetermined display method identifies a method for displaying the image data. For example, the image data V1, the data V11, or the data V12 can be used for data to be displayed, for example.

For example, a method for displaying the image data V1 can be associated with the first mode. Another method for displaying the image data V1 can be associated with the second mode. Thus, a display method can be selected on the basis of the selected mode.

For example, three different methods for displaying the image data V1 can be associated with the first display method to the third display method. Thus, display can be performed on the basis of the selected display method.

<<First Mode>>

Specifically, a method of supplying selection signals to a scan line at a frequency of 30 Hz or more, preferably 60 Hz or more, and displaying an image in accordance with the selection signals can be associated with the first mode.

For example, the supply of selection signals at a frequency of 30 Hz or more, preferably 60 Hz or more, can display a smooth moving image.

For example, an image is refreshed at a frequency of 30 Hz or more and preferably 60 Hz or more, so that an image smoothly following the user's operation can be displayed on the data processing device 200 the user operates.

<<Second Mode>>

Specifically, a method of supplying selection signals to a scan line at a frequency of less than 30 Hz, preferably less than 1 Hz, further preferably once a minute and displaying an image in accordance with the selection signals can be associated with the second mode.

The supply of selection signals at a frequency of less than 30 Hz, preferably less than 1 Hz, further preferably once a minute, can perform display with flickers reduced. Furthermore, power consumption can be reduced.

For example, when the data processing device 200 is used for a clock or watch, the display can be refreshed at a frequency of once a second, once a minute, or the like.

For example, image data can be displayed with a backlight which emits light in a pulsed manner. Specifically, an organic EL element can be configured to emit light in a pulsed manner, and its afterglow can be used for display. The organic EL element has excellent frequency characteristics; thus, time for driving the light-emitting element can be shortened, and thus power consumption can be reduced in some cases. Alternatively, heat generation can be inhibited, and thus the deterioration of the light-emitting element can be suppressed in some cases.

<<First Display Method>>

Specifically, a method in which the reflective display element is used to display image data can be used as the first display method. Thus, for example, the power consumption can be reduced. In addition, image data with high contrast can be favorably displayed in a bright environment.

<<Second Display Method>>

Specifically, a method in which the transmissive display element is used to display image data can be used as the second display method. Thus, for example, an image can be favorably displayed in a dark environment. Furthermore, a photograph and the like can be displayed with favorable color reproducibility. In addition, a moving image which moves quickly can be displayed smoothly.

In the case where the image data V1 is displayed using the transmissive display element, brightness for displaying the image data V1 can be determined on the basis of illuminance data. For example, when illuminance is higher than or equal to 5,000 lux and less than 100,000 lux, the image data V1 is displayed using the transmissive display element to be brighter than the case where the illuminance is less than 5,000 lux.

<<Third Display Method>>

Specifically, a method in which the reflective display element and the transmissive display element are used to display image data can be used as the third display method. In that case, power consumption can be reduced. Thus, for example, an image can be favorably displayed in a dark environment. Furthermore, a photograph and the like can be displayed with favorable color reproducibility. In addition, a moving image which moves quickly can be displayed smoothly.

Note that a function of adjusting the brightness of display by using the reflective display element and the transmissive display element for display can be referred to as a light adjusting function. For example, the brightness of a reflective display element can be compensated using light from the backlight which is adjusted by the transmissive display element.

Note that a function of adjusting the color of display by using the reflective display element and the transmissive display element can be referred to as a color adjusting function. For example, the color displayed by the reflective display element can be changed using light from the backlight which is adjusted by the transmissive display element. Specifically, the use of light adjusted to have a color of blue by the transmissive display element can make a yellowish color displayed by the reflective display element closer to white. Thus, text data can be displayed like texts printed on a plain paper, for example. Furthermore, an eye-friendly display can be achieved.

[Fourth Step]

In the fourth step, the program moves to the fifth step when a termination instruction is supplied, and the program moves to the third step when the termination instruction is not supplied (see S4 in FIG. 11A).

For example, the termination instruction supplied in the interrupt processing can be used to determine the next step.

[Fifth Step]

In the fifth step, the program terminates (see S5 in FIG. 11A).

<<Interrupt Processing>>

The interrupt processing includes sixth to eighth steps described below (see FIG. 11B).

[Sixth Step]

In the sixth step, the illuminance of the environment where the data processing device 200 is used can be sensed using the sensor portion 250, for example (see S6 in FIG. 11B). Note that color temperature or chromaticity of ambient light can be sensed instead of the illuminance of the environment.

[Seventh Step]

In the seventh step, a display method is determined on the basis of the sensed illuminance data. For example, the first display method is determined when the illuminance is greater than or equal to the predetermined value, whereas the second display method is determined when the illuminance is less than the predetermined value. Furthermore, the display method may be determined to be the third display method when the illuminance is within a predetermined range (see S7 in FIG. 11B).

Specifically, in the case where the illuminance is greater than or equal to 100,000 lux, the first display method may be determined to be used. In the case where the illuminance is less than 5,000 lux, the second display method may be determined to be used. In the case where the illuminance is greater than or equal to 5,000 lux and less than 100,000 lux, the third display method may be determined to be used.

In the case where color temperature or chromaticity of the ambient light is sensed in the sixth step, the color of display may be adjusted using the transmissive display element by the third display method.

For example, the first-status control data SS is supplied when the first display method is used, the second-status control data SS is supplied when the second display method is used, and the third-status control data SS is supplied when the third display method is used.

[Eighth Step]

In the eighth step, the interrupt processing terminates (see S8 in FIG. 11B).

<Structure Example 2 of Data Processing Device>

Another structure of a data processing device of one embodiment of the invention disclosed in this specification will be described with reference to FIG. 12.

FIG. 12 is a flow chart illustrating the program of one embodiment of the invention disclosed in this specification. The interrupt processing in the flow chart in FIG. 12 is different from that in FIG. 11B.

Note that a structure example 3 of the data processing device is different from the interrupt processing in FIG. 11B in that the interrupt processing includes a step in which a mode is changed on the basis of supplied predetermined event. Different structures are described in detail below, and the above description is referred to for the other similar structures.

<<Interrupt Processing>>

The interrupt processing includes sixth to eighth steps described below (see FIG. 12).

[Sixth Step]

In the sixth step, the processing proceeds to the seventh step when a predetermined event has been supplied, whereas the processing proceeds to the eighth step when the predetermined event has not been supplied (see U6 in FIG. 12). For example, whether the predetermined event is supplied in a predetermined period or not can be a branch condition. Specifically, the predetermined period can be longer than 0 seconds and shorter than or equal to 5 seconds, preferably shorter than or equal to 1 second, further preferably shorter than or equal to 0.5 seconds, still further preferably shorter than or equal to 0.1 seconds.

[Seventh Step]

In the seventh step, the mode is changed (see U7 in FIG. 12). Specifically, the mode is changed to the second mode when the first mode has been selected, or the mode is changed to the first mode when the second mode has been selected.

[Eighth Step]

In the eighth step, the interrupt processing terminates (see U8 in FIG. 12). Note that in a period in which the main processing is executed, the interrupt processing may be repeatedly executed.

<<Predetermined Event>>

The following events can be used, for example: events supplied using a pointing device (e.g., "click" and "drag") and events supplied to a touch panel with a finger or the like used as a pointer (e.g., "tap", "drag", or "swipe").

Furthermore, for example, the position of a slide bar pointed by a pointer, the swipe speed, and the drag speed can be used as parameters assigned to an instruction associated with the predetermined event.

For example, data sensed by the sensor portion 250 is compared to a predetermined threshold value, and the compared results can be used for the event.

Specifically, a pressure sensor or the like in contact with a button or the like that can be pushed in a housing can be used as the sensor portion 250.

<<Instruction Associated with Predetermined Event>>

The termination instruction can be associated with a predetermined event, for example.

For example, "page-turning instruction" for switching displayed image data from one to another can be associated with a predetermined event. Note that a parameter for determining the page-turning speed or the like when the "page-turning instruction" is executed can be supplied using the predetermined event.

For example, "scroll instruction" for moving the display position of part of image data and displaying another part continuing from that part can be associated with a predetermined event. Note that a parameter for determining the moving speed of the display position or the like when the "scroll instruction" is executed can be supplied using the predetermined event.

For example, an instruction for setting the display method or an instruction for generating image data can be associated with a predetermined event. Note that a parameter for determining the brightness of a generated image can be associated with a predetermined event. Note that a parameter for determining the brightness of a generated image may be determined on the basis of ambient luminance sensed by the sensor portion 250.

For example, an instruction for acquiring data distributed via a push service using the communication portion 290 can be associated with a predetermined event.

Note that positional data sensed by the sensor portion 250 may be used for the determination of the presence or absence of a qualification for acquiring data. Specifically, it may be determined that there is a qualification for acquiring data when the user is in a predetermined class room, school, conference room, office, or building. For example, educational materials can be fed from a classroom of a school, a university, or the like, so that the data processing device 200 can be used as a schoolbook or the like (see FIG. 10C). Alternatively, materials distributed from a conference room in, for example, a company can be received and used for a conference material.

Note that this embodiment can be combined with any of the other embodiments in this specification as appropriate.

Embodiment 4

In this embodiment, electronic devices each including the data processing device which is one embodiment of the invention disclosed in this specification and includes the display device described in Embodiment 1 or Embodiment 2 are described with reference to FIGS. 13A to 13H.

FIGS. 13A to 13H illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 13A:
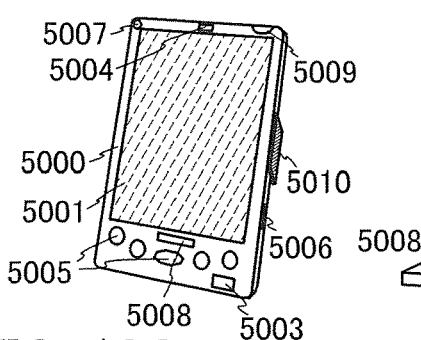
FIGS. 13A to 13H each illustrate a structure of an electronic device.
Figure 13B:
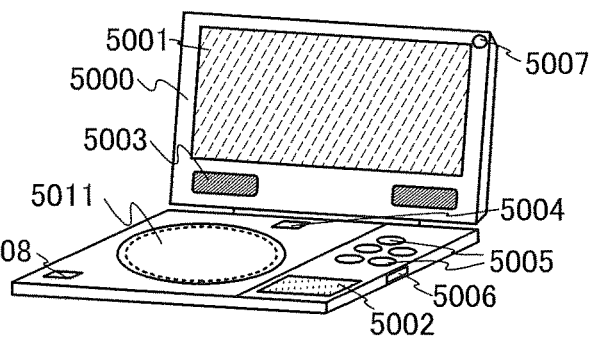
Figure 13C:
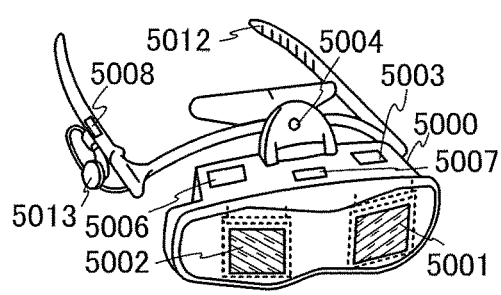
Figure 13D:
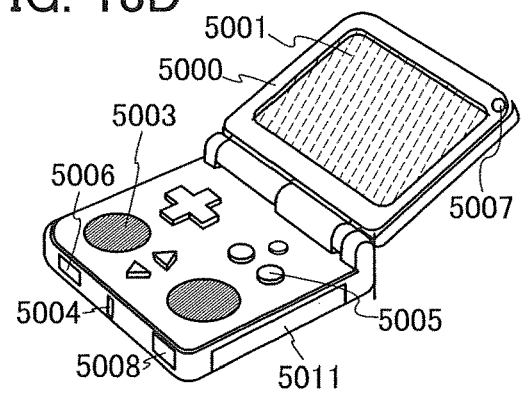
Figure 13E:
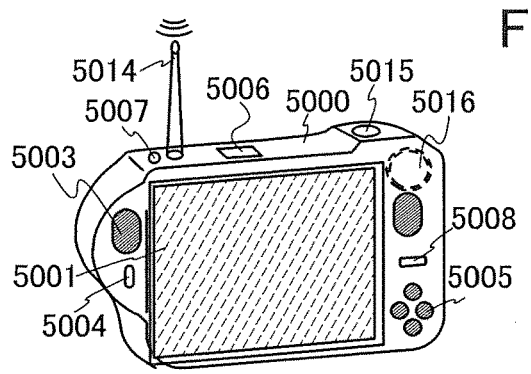
Figure 13F:
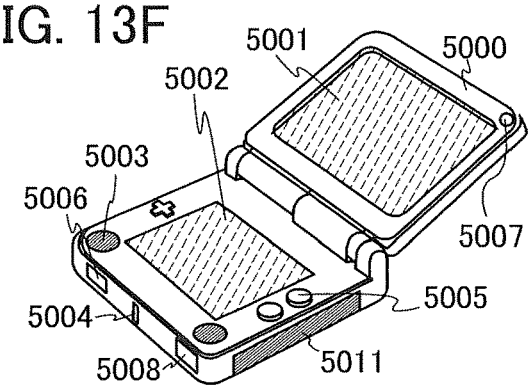
Figure 13G:
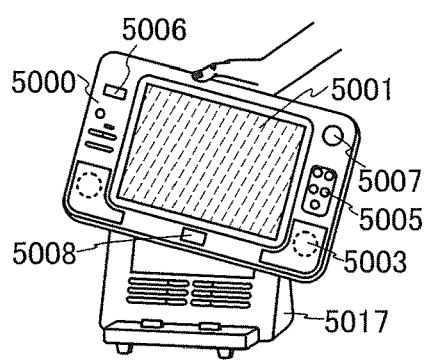

FIG. 13A illustrates a portable computer, which can include a switch 5009, an infrared port 5010, and the like in addition to the above components. FIG. 13B illustrates a portable image reproducing device provided with a memory medium (e.g., a DVD reproducing device), which can include a second display portion 5002, a memory medium read portion 5011, and the like in addition to the above components. FIG. 13C illustrates a goggle-type display, which can include the second display portion 5002, a support 5012, an earphone 5013, and the like in addition to the above components. FIG. 13D illustrates a portable game machine, which can include the memory medium read portion 5011 and the like in addition to the above components. FIG. 13E illustrates a digital camera with a television reception function, which can include an antenna 5014, a shutter button 5015, an image reception portion 5016, and the like in addition to the above components. FIG. 13F illustrates a portable game machine, which can include the second display portion 5002, the memory medium read portion 5011, and the like in addition to the above components. FIG. 13G illustrates a portable television receiver, which can include a charger 5017 capable of transmitting and receiving signals, and the like in addition to the above components.

The electronic devices illustrated in FIGS. 13A to 13G can have a variety of functions. The electronic devices illustrated in FIGS. 13A to 13G can have a variety of functions, for example, a function of displaying a variety of information (e.g., a still image, a moving image, and a text image) on a display portion; a touch panel function; a function of displaying a calendar, date, time, and the like; a function of controlling processing with a variety of software (programs); a wireless communication function; a function of being connected to a variety of computer networks with a wireless communication function; a function of transmitting and receiving a variety of data with a wireless communication function; and a function of reading a program or data stored in a memory medium and displaying the program or data on a display portion. Furthermore, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a memory medium (an external memory medium or a memory medium incorporated in the camera), a function of displaying a photographed image on the display portion, or the like. Note that functions of the electronic devices illustrated in FIGS. 13A to 13G are not limited thereto, and the electronic devices can have a variety of functions.

Figure 13H:
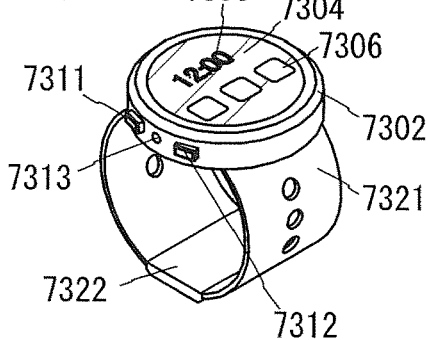

FIG. 13H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

Note that the smart watch illustrated in FIG. 13H can have a variety of functions. The smart watch illustrated in FIG. 13H can have a variety of functions, for example, a function of displaying a variety of information (e.g., a still image, a moving image, and a text image) on a display portion; a touch panel function; a function of displaying a calendar, date, time, and the like; a function of controlling processing with a variety of software (programs); a wireless communication function; a function of being connected to a variety of computer networks with a wireless communication function; a function of transmitting and receiving a variety of data with a wireless communication function; and a function of reading a program or data stored in a memory medium and displaying the program or data on a display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the display panel 7304.

Note that this embodiment can be combined with any of the other embodiments in this specification as appropriate.

This application is based on Japanese Patent Application Serial No. 2016-146992 filed with Japan Patent Office on Jul. 27, 2016, Japanese Patent Application Serial No. 2016-146994 filed with Japan Patent Office on Jul. 27, 2016, and Japanese Patent Application Serial No. 2016-146996 filed with Japan Patent Office on Jul. 27, 2016, the entire contents of which are hereby incorporated by reference.

What is claimed is:
1. A display device comprising:
a first substrate;
a layer including a first transistor over the first substrate;
a first display element including a first pixel electrode layer, a first liquid crystal, and a first counter electrode layer over the layer including the first transistor;
a layer including a second transistor over the first display element; and
a second display element including a second pixel electrode layer, a second liquid crystal, and a second counter electrode layer over the layer including the second transistor,
wherein the first counter electrode layer and the layer including the second transistor are in contact with each other,
wherein the second pixel electrode layer and the layer including the second transistor are in contact with each other,
wherein the first display element is a transmissive display element,
wherein the second display element is a reflective display element,
wherein the first substrate, the first pixel electrode layer, the first counter electrode layer, and the second counter electrode layer have a light-transmitting property, and
wherein the second pixel electrode layer has a reflective property.

2. The display device according to claim 1,
wherein the layer including the second transistor comprises a wiring layer which electrically connects the second transistor and the second pixel electrode layer and an insulating film between the second transistor and the second pixel electrode layer,
wherein the insulating film includes an opening reaching the second pixel electrode layer, and
wherein the wiring layer is in the opening.

3. The display device according to claim 1,
wherein the first counter electrode layer and the layer including the second transistor are firmly attached to each other with a bonding layer.

4. The display device according to claim 3, further comprising:
a first terminal electrically connected to the first transistor;
a first flexible printed circuit board electrically connected to the first terminal;
a second terminal electrically connected to the second transistor; and
a second flexible printed circuit board electrically connected to the second terminal.

5. The display device according to claim 1,
wherein a thickness of the first liquid crystal is different from a thickness of the second liquid crystal.

6. The display device according to claim 1,
wherein a material for the first liquid crystal is different from a material for the second liquid crystal.

7. The display device according to claim 1,
wherein a driving mode of the first display element is a vertical alignment mode, and
wherein a driving mode of the second display element is a twisted nematic mode.

8. The display device according to claim 1,
wherein a structure of the first transistor is different from a structure of the second transistor.

* * * * *